United States Patent
Iwasaki et al.

(10) Patent No.: US 7,098,168 B2
(45) Date of Patent: *Aug. 29, 2006

(54) HEAT-SENSITIVE RECORDING MATERIAL

(75) Inventors: Masayuki Iwasaki, Shizuoka (JP);
Tsutomu Watanabe, Shizuoka (JP);
Hirofumi Mitsuo, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/499,057

(22) PCT Filed: Dec. 20, 2002

(86) PCT No.: PCT/JP02/13395

§ 371 (c)(1),
(2), (4) Date: Jun. 18, 2004

(87) PCT Pub. No.: WO03/059639

PCT Pub. Date: Jul. 24, 2003

(65) Prior Publication Data

US 2005/0088508 A1    Apr. 28, 2005

(30) Foreign Application Priority Data

Dec. 20, 2001    (JP) ............................. 2001-387594
Dec. 20, 2001    (JP) ............................. 2001-388131
Dec. 20, 2001    (JP) ............................. 2001-388133

(51) Int. Cl.
*B41M 5/30* (2006.01)

(52) U.S. Cl. .................. 503/209; 503/200; 503/216; 503/221; 503/226

(58) Field of Classification Search ........ 500/200–226; 503/200–226
See application file for complete search history.

(56) References Cited

U.S. PATENT DOCUMENTS

| | | | |
|---|---|---|---|
| 4,414,259 A | 11/1983 | Tsuchiya et al. | |
| 4,585,483 A | 4/1986 | Ikeda et al. | |
| 5,068,133 A | 11/1991 | Matsumoto et al. | |
| 5,071,821 A | 12/1991 | Smith et al. | |
| 5,112,798 A | 5/1992 | Miyauchi | |
| 5,721,190 A | 2/1998 | Miyamoto et al. | |
| 5,847,744 A | 12/1998 | Hoki et al. | |
| 6,410,479 B1 | 6/2002 | Fukuchi et al. | |
| 6,497,926 B1 | 12/2002 | Yokota et al. | |
| 6,596,358 B1 | 7/2003 | Sakamoto et al. | |
| 6,642,175 B1 | 11/2003 | Mitsuo et al. | |
| 6,699,816 B1* | 3/2004 | Iwasaki et al. ............. 503/209 |
| 6,818,592 B1 | 11/2004 | Watanabe et al. | |
| 6,852,671 B1* | 2/2005 | Iwasaki et al. ............. 503/216 |
| 6,972,272 B1* | 12/2005 | Iwasaki et al. ............. 503/216 |
| 2004/0176247 A1 | 9/2004 | Iwasaki et al. | |
| 2005/0054527 A1 | 3/2005 | Iwasaki et al. | |
| 2005/0170959 A1 | 8/2005 | Iwasaki et al. | |

FOREIGN PATENT DOCUMENTS

| | | |
|---|---|---|
| EP | 0 405 363 A2 | 1/1991 |
| EP | 0 462 770 A1 | 12/1991 |
| EP | 0 542 556 A1 | 5/1993 |
| EP | 0631876 A2 | 1/1995 |
| EP | 0992363 A1 | 4/2000 |
| EP | 1 060 904 A2 | 12/2000 |
| JP | 49-024133 A | 3/1974 |
| JP | 54-074761 A | 6/1979 |
| JP | 56-017286 A | 2/1981 |
| JP | 57-41995 A | 3/1982 |
| JP | 57-212094 A | 12/1982 |
| JP | 61-057387 A | 3/1986 |
| JP | 62-268686 A | 11/1987 |
| JP | 1-306282 A | 12/1989 |
| JP | 2-020385 A | 1/1990 |
| JP | 02-169291 A | 6/1990 |
| JP | 3-193485 A | 8/1991 |
| JP | 3-290285 A | 12/1991 |
| JP | 4-001085 A | 1/1992 |
| JP | 04-105987 A | 4/1992 |
| JP | 4-110188 A | 4/1992 |

(Continued)

OTHER PUBLICATIONS

International Search Report for PCT/JP02/13395 dated Apr. 15, 2003.

(Continued)

*Primary Examiner*—Bruce H. Hess
(74) *Attorney, Agent, or Firm*—Sughrue Mion, PLLC

(57) ABSTRACT

(B) A thermosensitive recording material comprises a thermosensitive recording layer containing an electron-donating colorless dye, an electron-accepting compound which develops color upon a reaction with the electron-donating colorless dye and a sensitizer, wherein the thermosensitive recording material satisfies at least one of the following conditions (1) to (3).

(1) An image density when thermal printing is performed with a printing energy is 1.20 or more, and the thermosensitive recording material is used for a recording device having a printing speed of 10 cm/sec or more.

(2) An image density after the thermosensitive recording material is brought into contact with a heat source of 70° C. for 5 seconds is 0.15 or less, and the sensitizer is 2-benzyloxynaphthalene or the like.

(3) the electron-accepting compound is a compound represented by $R^1$-Ph-$SO_2R^2$ wherein $R^1$ represents a hydroxyl group or an alkyl group, $R^2$ represents -Ph, —NH-Ph, -Ph-$OR^3$ or —NH—CO—NH-Ph, $R^3$ represents an alkyl group, Ph represents a phenyl group and may be substituted with a substituent containing $SO_2R^2$, and a volume-averaged grain size is in a range of 0.5 to 1.0 μm.

15 Claims, No Drawings

FOREIGN PATENT DOCUMENTS

| | | |
|---|---|---|
| JP | 04-221681 A | 8/1992 |
| JP | 4-325285 A | 11/1992 |
| JP | 04-332682 A | 11/1992 |
| JP | 5-032052 A | 2/1993 |
| JP | 5-104062 A | 4/1993 |
| JP | 05-147357 A | 6/1993 |
| JP | 6-072051 A | 3/1994 |
| JP | 6-179290 A | 6/1994 |
| JP | 6-183158 A | 7/1994 |
| JP | 6-210952 A | 8/1994 |
| JP | 6-344671 A | 12/1994 |
| JP | 7-089237 A | 4/1995 |
| JP | 07-137317 A | 5/1995 |
| JP | 7-290835 A | 11/1995 |
| JP | 7-314896 A | 12/1995 |
| JP | 7-314914 A | 12/1995 |
| JP | 8-039937 A | 2/1996 |
| JP | 08-118808 A | 5/1996 |
| JP | 08-207335 A | 8/1996 |
| JP | 9-131969 A | 5/1997 |
| JP | 09-142018 A | 6/1997 |
| JP | 9-150584 A | 6/1997 |
| JP | 10-035103 A | 2/1998 |
| JP | 11-011024 A | 1/1999 |
| JP | 11-048610 A | 2/1999 |
| JP | 11-070736 A | 3/1999 |
| JP | 11-208122 A | 8/1999 |
| JP | 11-254837 A | 9/1999 |
| JP | 11-291633 A | 10/1999 |
| JP | 11-342676 A | 12/1999 |
| JP | 2000-168242 A | 6/2000 |
| JP | 2000-247037 A | 9/2000 |
| JP | 2000-247038 A | 9/2000 |
| JP | 2000-263944 A | 9/2000 |
| JP | 2000-326632 A | 11/2000 |
| JP | 2000-345067 A | 12/2000 |
| JP | 2000-347341 A | 12/2000 |
| JP | 2001-113837 A | 4/2001 |
| JP | 2001-150820 A | 6/2001 |
| JP | 2001-162935 A | 6/2001 |
| JP | 2001-219651 A | 8/2001 |
| JP | 2001-246863 A | 9/2001 |
| JP | 2001-293956 A | 10/2001 |
| JP | 2002-086910 A | 3/2002 |
| JP | 2002-127601 A | 5/2002 |
| JP | 2002-127604 A | 5/2002 |
| JP | 2002-264534 A | 9/2002 |
| JP | 2002-301873 A | 10/2002 |
| JP | 2002-326459 A | 11/2002 |
| JP | 2003-025734 A | 1/2003 |
| JP | 2003-127552 A | 5/2003 |
| JP | 2003-182227 A | 7/2003 |
| JP | 2003-182245 A | 7/2003 |
| JP | 2003-182248 A | 7/2003 |
| WO | WO 00/53427 A1 | 9/2000 |
| WO | WO 02/098673 A1 | 12/2002 |
| WO | WO 03/002354 A1 | 1/2003 |

OTHER PUBLICATIONS

Notice of Reasons for Rejection, Japanese Patent Office, Patent Application No. 2001-388133, mailed Mar. 14, 2006.

* cited by examiner

HEAT-SENSITIVE RECORDING MATERIAL

TECHNICAL FIELD

The present invention relates to a thermosensitive recording material. Specifically, the invention relates to a thermosensitive recording material having superior apparatus applicability that does not cause deterioration of apparatus durability such as head abrasion, etc.; having photographic applicability and stability as a recording medium; having printing applicability, stamping applicability, environmental applicability, etc.; and having usefulness as a plain paper-like recording medium.

BACKGROUND ART

Historically, dye-type thermosensitive paper containing a colorless leuco dye and a phenolic acidic substance was developed as a thermosensitive recording technology by NCR Inc. in 1960s, and this system has become the mainstream of a thermosensitive recording systems. Thereafter demands for thermosensitive paper (hereinafter referred to as "thermosensitive recording material") have increased rapidly (1) since miniaturization and price reduction of apparatuses became possible due to development of thermal heads based on semiconductor technologies and significant improvement in cost and performance; (2) since, high quality (high sensitivity, improvement of head matching property, etc.) of thermosensitive paper (thermosensitive recording material) itself was realized; and (3) since the thermosensitive recording system was evaluated to be advantageous in view of user-friendliness, i.e., convenience, low costs, freedom from maintenance, etc. as compared to other recording systems such as static recording, ink jet recording, PPC recording, etc.

However, as thermosensitive recording materials are used for facsimiles, various printers, etc. and have become familiar to daily life, defects of thermosensitive recording materials have been also recognized well. Namely, the following defects have been pointed out:
discoloration by light;
discoloration during storing at high temperature (being left in a vehicle, etc.);
fading of a recorded image by chemical agents such as a plasticizers in wrapping films, oils, organic solvents in marker pens, ink for ink jet printers, etc.;
a lack of plain paper-like feeling (good stamping property such as good drying of stamps, etc., a matted recording surface which is easy to read, good writing property with respect to a pencil, etc., resistance to staining by friction, etc., and so forth), etc.

Therefore, development and provision of a thermosensitive recording material free from the above-mentioned defects and having high value have been required.

Recently, thermosensitive recording materials have been widely used since they are relatively inexpensive and recording apparatus therefor are compact and freedom from maintenance. Under such circumstances, competition in the market of thermosensitive recording materials has become fierce, and demand for thermosensitive recording materials having higher performances that are different from those of conventional ones, and specifically thermosensitive recording materials having high density of developed color, whiteness of background, sharpness, storage stability, good hue and sharpness for a full-color image printed by an ink jet recording system, etc. has increased. Therefore, intensive investigations concerning various performances such as color developing property, storage property, etc. of thermosensitive recording materials are now being conducted in order to satisfy such demands.

The performances that the thermosensitive recording materials should have include, for example, (1) high sensitivity (capability to provide high density); (2) high whiteness of a background portion (non-printed portion) (low background fogging); (3) superior image storage property after photographic printing; (4) superior light fastness; (5) superior resistance to chemical substances; (6) sharpness and high image quality; (7) good hue and sharpness of colors for a full-color image printed by an ink jet recording system; (8) good thermal head matching property and head resistance property by which thermal head abrasion is decreased; (9) plane paper-like feeling; (10) printing applicability that enables printing on a thermosensitive recording layer, and stamping property free from bleeding; (11) applicability for high performance printers such as a high speed printer, etc.; and (12) environmental applicability, etc. Under the above-mentioned circumstances, it is required that all of these performances are simultaneously satisfied without deteriorating any of the performances. However, under the present circumstances, a thermosensitive recording material that can satisfy all of the above-mentioned performances simultaneously has not been provided yet. In particular, the following points can be conspicuously noted.

For instance, although high-speed printing (photo printing) is demanded in fields such as use for receipts in POS (point of sales) registers, a problem exists in that when high-speed printing is performed in general, head contamination is easily caused, and consequently, print quality is deteriorated as a result of the head contamination. In particular, in recent years, in order to reduce the production cost, a printer which can selectively use a thermal transfer recording is provided. However, the printer is provided with a thermal head having a so-called partial glaze structure to impart a thermal transfer recording capability. As a result, in particular, the printer has the tendency to cause head contamination when high-speed printing (photo printing) is performed on the thermosensitive recording material.

Although stability which can stably maintain recording for a long period of time, that is, image preservability with respect to temperature and humidity conditions, and stability of an image (plasticizer resistance and chemical resistance) with respect to a plasticizer or the like are very important in fields such as use for receipts in the POS registers, a thermosensitive recording material which can always sufficiently maintain a formed image has not been provided up to now.

On the other hand, Japanese Patent Application Laid-Open (JP-A) No. 6-135159 discloses a thermosensitive recording material containing a salicylic acid derivative and/or metal salt thereof having an aryloxyalkyloxy group as a substituent as an electron-accepting compound, whereby chemical resistance is improved. However, image density and head contamination (high-speed print capability) or the like at the time of high-speed printing are insufficient, and improvement is further required.

Furthermore, such system also has a problem in view of (13) ink jet applicability. Namely, full color information is sometimes recorded on a thermosensitive recording material using ink for ink jet printing. However, when ink jet printing is carried out on a recording surface of a conventional thermosensitive recording material containing bisphenol A, hues of ink cannot be reproduced faithfully, and sharp hues can not be obtained. Further, when an image is already formed on the recording surface by thermosensitive recording, the image sometimes fades. Furthermore, when the above-mentioned conventional thermosensitive recording material is placed in contact with a medium having an image printed thereon by an ink jet printer, background fogging or fading of the recorded image sometimes occurs.

DISCLOSURE OF INVENTION

The present invention aims at solving the above-mentioned conventional problems and achieving the following objects.

Namely, an object of the invention is to provide a thermosensitive recording material which can be printed at a high speed (photo print), suppress the low fogging density (ground fogging) of the ground portion (non-image portion), can prevent the head contamination caused by the high-speed printing, has no head abrasion, and is excellent in the head matching properties (photo print). In addition, it is an object of the invention to provide a thermosensitive recording material which can obtain the high image having high sharpness, is excellent in the plasticizer resistance of the forming image, the image preservability, chemical resistance, and the light fastness, has the ink jet capability which does not have the defective hue, the bleeding of the ink jet image and the image discoloration caused by the ink for ink jet, can be also printed or sealed on the thermosensitive recording layer or the protective layer without the bleeding, can be also formed with a little amount of coating (environmental applicability) at low-cost, and has a plain paper-like feel if necessary.

The present inventors have done intensive studies on the technologies for satisfying the performances that a thermosensitive recording material should have at high level simultaneously, and obtained the following findings.

Provision of High Sensitivity

In order to provide high sensitivity, the following (1) to (3) are important.

(1) Firstly, it is important to improve heat conduction from a thermal head to a thermosensitive recording layer. For this purpose, it is effective to improve the surface smoothness of a recording surface of a thermosensitive recording material and to provide cushioning property to the recording surface. (2) Secondly, it is important to utilize the heat conducted from the thermal head effectively. For this purpose, it is effective to athermalize a substrate and to thin down the thermosensitive recording layer. (3) Thirdly, it is important to improve solubilization velocities of an electron-donating colorless dye and an electron-accepting compound in a sensitizer. For this purpose, it is effective to improve solubility, decrease the melt viscosity, and to decrease the particle size of the material. Hereinafter (1) to (3) are specifically explained.

(1) Improvement of Heat Conduction from a Thermal Head to a Thermosensitive Recording Layer Since a certain amount of heat is required to develop a color on a thermosensitive recording layer to a certain density, it is important to conduct the heat from the thermal head to the recording layer effectively in order to improve sensitivity of a thermosensitive recording material. Heat conductivity of a solid substance is enormously higher than that of gas, and conducted heat is much higher than radiated heat. Therefore, it is effective to increase the contact interval of the surface of the thermosensitive recording layer (hereinafter sometimes referred to as "recording surface") during photographic printing and the thermal head, and whereby the heat from the thermal head can be conducted effectively to the thermosensitive recording layer.

In order to increase the contact interval of the recording surface and the thermal head, it is specifically effective to [1] increase the smoothness of the recording surface in advance, and to [2] increase cushioning property of the thermosensitive recording material, etc., as physical properties required in the thermosensitive recording material.

[1] In order to increase smoothness of the recording surface, it is effective to improve the planarity of a substrate. Specifically, it is desirable to use base paper having high planarity and to provide a primer layer comprising an oil-absorbing pigment as a main component on a substrate for eliminating irregularity due to pulp, etc. Furthermore, it is effective to conduct heat calendar or super calendar treatment after applying the recording layer and drying in order to increase smoothness.

[2] Furthermore, the effectiveness of increasing the cushioning property of the thermosensitive recording material (provision of cushioning property) is based on the following findings. That is, when heat photographic printing is carried out on a thermosensitive recording material using a thermal head, a suitable pressure is applied using a platen roll. A thermosensitive recording material that changes its shape easily is sufficient to increase the contact interval between the thermal head and the recording surface under the pressure. Therefore, it is effective to provide a primer layer containing an oil-absorbing pigment as a main component and incorporating a pigment having high oil-absorbing property in the thermosensitive recording layer as specific means for providing cushioning property. Specifically, this concept for providing cushioning property is also effective for increasing sensitivity when recording is conducted using a thermal head having a partially-glazed structure. As used herein, the partially-glazed structure refers to a structure wherein the cross-section of a glazed layer of a heat generating portion has a convex (chevron) shape on a substrate.

(2) Effective Utilization of Heat Conducted from a Thermal Head

In order to utilize heat conducted from a thermal head effectively, it is effective to athermalize a substrate. Specific means for this purpose is to provide gaps as many as possible in the substrate. In the case of the thermosensitive recording material, for example, the means includes providing a primer layer comprising a pigment having high oil-absorbing property to decrease the amount of a binder used in the primer layer as possible, incorporating hollow particles in the primer layer, etc.

Furthermore, it is effective to thin down the thermosensitive recording layer in order to utilize heat effectively. Considering that the heat capacity of the thermosensitive recording layer contributes to the sensitivity, the thermosensitive recording layer contains many components those do not contribute to the development of color, and the heat capacities thereof are consumed unnecessarily. Such components include a releasing agent and wax, which suppress adhesion between the thermal head and the recording layer, an oil-absorbing pigment that absorbs melted components, binders for providing distribution of materials and film strength, etc. Since the heat consumption by these components extends to about 20% to 30%, it is expected to increase the sensitivity by about 10% to 15% by reducing the amount of these components by half.

According to the inventor's investigation, sensitivity can be increased by decreasing the amounts of a pigment and a binder in a recording layer. Since sensitivity can be increased unexpectedly by decreasing the amount of the binder, it is considered that the factors other than heat capacity contribute to the sensitivity. However, the reason why the sensitivity can be increased is not clarified yet. It should be noted that, however, when the amount of the binder is simply decreased, head matching property, film strength, etc. of the thermal head deteriorate. Accordingly, it is important to use effective incorporation ratio as possible, i.e., use desired components in a desired layer at the minimum amount.

(3) Improvement of the Solubilization Velocities of an Electron-Donating Colorless Dye and an Electron-Accepting Compound in a Sensitizer In the earlier step of the technical development in thermal recording materials, a sensitizer has been selected as a melting point decreasing agent for an electron-donating colorless dye and an electron-accepting compound in order to developing a color at a lower temperature. However, in this concept, there is a limitation to increase the sensitivity while keeping color-development onset temperature, which makes difficult consistency between background fogging property and sensitivity. Accordingly, the inventors have considered a sensitizer as a material for solubilizing an electron-donating colorless dye and an electron-accepting compound and have done investigation on a sensitizer that realizes high sensitivity while keeping background fogging property at low level without decreasing the co-melting point unnecessarily, and obtained a finding that it is more advantageous for increasing sensitivity to diffuse the electron-donating colorless dye and the electron-accepting compound in the melted sensitizer more rapidly. Accordingly, it is advantageous and preferable for increasing sensitivity to select a sensitizer having not only high solubility but also low melt viscosity, and to decrease the diffusion particle size of the electron-donating colorless dye and the electron-accepting compound. It should be noted that, however, when the diffusion particle size is too small, the background fogging property becomes worse, and therefore, it is important to select a suitable size. Provision of matching property with a thermal head, and head durability.

A thermosensitive recording material is subjected to photographic printing (printing), wherein a thermal head, which is a heat generating element, contacts directly to the recording surface thereof (surface of the thermosensitive recording layer) and robs the surface. Accordingly, the components in the melted recording layer sometimes adhere to the head and deposit as smutch thereon. Furthermore, the lifetime of the head as it is sometimes shortened by physical abrasion or corrosion, etc. of the surface of the thermal head.

Accordingly, it is desirable to apply the following means.

1) In view of prevention of head contamination, it is important to absorb and keep the substances such as a dye, a developer, a sensitizer, etc., each of which is melted by heat, on the surface of the material. For this purpose, it is effective to use a pigment having high oil-absorbing property for the recording layer, or to provide a primer layer comprising a pigment having high oil-absorbing property, etc. Alternatively, it is effective to select raw materials and a composition design for the substances so that a viscosity of the substances melted is minimized.

2) Furthermore, it is important to suppress content of ions ($Na^+$, $K^+$, etc.) in the components constituting the recording material, since the ions cause corrosion of the head easily.

3) In view of decreasing of physical abrasion as much as possible, it is important to consider hardness, shape, particle size, etc. of a pigment.

Compatibility of Heat Resistance or Image Retention Property (and Chemical Resistance) and Background Fogging A developed image is easy to come off due to an effect of a reverse reaction by chemical agents such as oils and fats, plasticizers, etc. since the chemical reaction that is occured by heat melt and contact of a leuco dye and a developer, which is a principle of color development of a thermosensitive recording material, is a reversible reaction. Accordingly, problems in view of heat resistance, image retention property (specifically moisture resistance) and chemical resistance, such as problems that the developed image comes off by heat or moisture during storage, by touching by a hand on which a hand cream, other cosmetics or oil and fat has been adhered, or by standing the image contacting with a plastic product comprising a plasticizer, a product comprising an organic solvent or a leather product (an eraser, a desk mat made of vinyl chloride, food wrapping film, a marker pen, ink for ink jet, a wallet, a commuter-pass holder, etc.) in daily life, are tend to take place.

In order to overcome the above-mentioned phenomenon due to the color development principle (coming off and fading of image), many investigations have been done. For example, [1] a method comprising making so-called an overcoat type material by forming a protective layer on a recording layer for the purpose of physical shielding, [2] a method comprising adding additives such as a cross-linking agent to a recording layer, etc. have been done. However, even a protective layer is provided, fading over time by gradual permeation of oil or a plasticizer can not be avoided. As a result, a thermosensitive recording material has problems that the usage of the material is limited to short-time application such as measuring labels to be adhered to perishable foods sold in supermarkets, etc., and that the effect of the color development requires considerably long time to be exhibited even a cross-linking substance is added, etc. Therefore, storage property, which is a basic performance has not been satisfied yet.

Accordingly, the inventors have investigated on improvement of storage property, and as a result, obtained findings that a specific electron-accepting compound is useful for improvement of image retention property as well as background fogging, and that background fogging can be further improved by combining the compound with a specific sensitizer and an electron-donating colorless dye. Furthermore, the inventors obtained a finding that image retention property and light fastness can be improved by combining the compound with a specific image stabilizer without deteriorating background fogging. According to these findings, it is also possible to provide image retention property together with stamping applicability and handling property at high level, which is difficult by a conventional technique for providing storage property depending on an overcoat. Accordingly, stamping applicability and image retention property can be achieved simultaneously.

Improvement of Light Fastness

A thermosensitive recording material having superior light fastness is sometimes required for some applications. However, since a leuco dye, which is responsive for image forming, easily decompose by ultraviolet light, etc., and also fades after a long time exposure of natural light. Therefore, the material comprising a leuco dye has a problem in view of light fastness.

In order to improve light fastness, it is important to provide a means for preventing decomposition of a leuco dye by light. For this purpose, it is effective to incorporate an ultraviolet light absorber (an image stabilizer), which prevents ultraviolet light that specifically provides high level energy, in a thermosensitive recording layer or a protective layer. Specifically, it is more effective to incorporate a liquid ultraviolet light absorber in microcapsules or in a protective layer in view of effective blockage of ultraviolet light before it arrives at the thermosensitive recording layer.

Provision of Printing Applicability

Offset printing is sometimes provided on a recording surface of a thermosensitive recording material (surface of a thermosensitive recording layer) depending on application. For such application, the material is required to have surface strength that can stand up to more than 100 m/min of printing velocity of a rotary form printing machine and wetting water absorbing property. For this purpose, it is important to optimize the incorporation ratio of a pigment and a binder in a thermosensitive recording layer. Preferable pigment for this purpose is an oil-absorbing pigment such as calcium carbonate, etc. Preferable binder for this purpose is polyvinyl alcohol (PVA), and sulfo-modified polyvinyl alcohol, diacetone-modified polyvinyl alcohol and acetoacetyl-modified polyvinyl alcohol are specifically preferred.

Provision of Plain Paper-Like Feeling

As a result of wide use of a thermosensitive recording material as recording paper for facsimiles at office and home and as recording paper for various printers, problem that the material provides uncomfortable feeling, i.e., smooth-faced feeling, bad writing property, thinness and unsufficient elasticity when holding by a hand have been pointed out actively in comparison with general paper (PPC paper, and quality paper such as notebook, writing paper, etc.). This is one of the reasons why facsimiles used in offices are recently replaced with PPC type facsimiles using plane paper. In view of these points, it is important to provide hand feeling and user-friendliness close to those of quality paper to a thermosensitive recording material by [1] thickening body paper that is used as a substrate to improve elasticity, or by [2] providing a protective layer to provide low surface gloss, writing property and stamping applicability, etc.

As used herein, a thermosensitive recording material having plain paper-like feeling is considered to have no defects of converted paper which the conventional thermosensitive paper has, have a matt-like surface, have no slimy feeling of hand feeling, and to have resistance to abrasion contamination and resistance to fading of a recorded image, etc. Accordingly, materials having a protective layer on a recording layer have been suggested for providing plane paper-like feeling. However, conventional protective layers were provided too much consideration on hand feeling, appearance (matt-like), writing property, etc., and were not provided any consideration regarding stamping applicability.

However, the inventors have considered that stamping applicability (no bleeding, good drying of stamped image, etc.) is specifically important in view of traditional custom in Japan, and have investigated improvement of a protective layer for a thermosensitive recording material having plain paper-like property.

As a result, the inventors obtained a finding that the following materials are useful for a pigment and a binder for a protective layer in order to obtain plain paper-like feeling including stamping applicability.

As the above-mentioned pigment, those having suitable particle size, oil-absorption amount and stamping applicability are preferred since stamping property, appearance (matt-like) and writing property are considered to be important. When the particle size is too large, image quality sometime becomes worse, and when the particle size is too small, writing property and appearance sometimes become worse. Furthermore, when the oil-absorption amount is too large, opacity of the protective layer increases, which leads to decrease of recording density, and when the oil-absorption amount is too small, stamping applicability (drying) tends to become worse.

As the above-mentioned binder, those obtained by mixing PVA and starch in a suitable ratio are preferable in order to prevent deterioration of stamping applicability (bleeding). As the above-mentioned PVA, those so called completely-saponified type PVA (having saponification degree of about 93% or more) are preferable in view of providing deterioration of stamping applicability (drying).

Provision of High Sensitivity and Head Matching Property in Combination with Apparatus The reason why thermosensitive recording materials have been applied to many fields and applications recently is that a thermosensitive recording system has advantages such as miniturization, low running cost, freedom from maintenance, and that technical improvements have been studied on both printers (hardware) and recording paper (medium). In view of hardware, for example, high performance printers such as those providing recording speed of 10 inch (about 25 cm)/sec, recording width of A0 size (about 900 mm) at maximum and resolution of 600 dpi (24 dot/mm) have emerged, which takes a place beside conventional dot printers and laser printers. Therefore, it is important for hardware to combine technologies according to application and to constitute hardware so as to have optimal design and controlling means.

Accordingly, preferable high performance printer specifically includes a high speed printer that provides recording velocity of not less than 10 cm/sec, a printer comprising a thermal head having partially-glazed structure, etc. However, when a conventional thermosensitive recording material is combined with the high speed printer that provides recording velocity of not less than 10 cm/sec, sensitivity is sometimes insufficient, and when it is combined with the printer comprising a thermal head having partially-glazed structure, head contamination tends to occur.

Accordingly, the inventors have investigated optimal design of a thermosensitive recording material, and obtained a finding that when a specific developer (an electron-accepting compound) is selectively used for the material, the material can exhibit high sensitivity and good head matching property while satisfying the above-mentioned performances required for a thermosensitive recording material at high level even when the material is specifically combined with the high speed printer that provides recording velocity of not less than 10 cm/sec or the printer comprising a thermal head having partially-glazed structure.

Improvement of Image Quality

For hardware (apparatuses) using a thermosensitive recording material, quality of recorded image is sometimes important as in the case of receiving a photograph by a facsimile, etc. Regarding improvement of the quality of recorded image, the inventors obtained a finding that it is effective to provide a primer layer comprising an oil-absorbing pigment as a main component, specifically to apply a primer layer by curtain coating method or blade coating method (specifically by blade coating method) for improving image quality.

Decrease of Environmental Burden

Recently, a system that provides low burden on environment is socially required, and it is no exception for the field of a thermosensitive recording materials. In order to decrease environmental burden, it is important to satisfy the required performances using lesser amount of materials and lesser amount of energy. For this purpose, the inventors obtained findings that applying a thermosensitive recording layer, etc. by curtain coating method is effective in view of improvement of color development density, and that applying plural of layers simultaneously to form multi-layered structure is effective in view of decreasing energy consumption during drying and handling. Accordingly, same color development density as before can be obtained by using lower amount of materials and lower energy.

The invention is based on the above-mentioned findings. The substantial means for solving the above-described problems are as follows.

Namely, the invention provides a thermosensitive recording material comprising: a support; and a thermosensitive recording layer formed on the support, the thermosensitive recording layer containing an electron-donating colorless dye and an electron-accepting compound which develops color upon a reaction with the electron-donating colorless dye, wherein the thermosensitive recording material satisfies at least one of the following conditions (1) to (3).

(1) An image density when thermal printing is performed from a side, of the support, having the thermosensitive recording layer with printing energy of 15.2 mJ/mm$^2$ is 1.20 or more, and the thermosensitive recording material is used for a recording device having a printing speed of 10 cm/sec or more.

(2) The thermosensitive recording material contains a sensitizer comprising at least one compound selected from the group consisting of 2-benzyloxynaphthalene, dimethylbenzyloxalate, m-terphenyl, ethyleneglycol tolyl ether, p-benzyl biphenyl, 1,2-diphenoxymethyl benzene, diphenyl sulfone and 1,2-diphenoxy ethane, and an image density after the thermosensitive recording material is brought into contact with a heat source of 70° C. for 5 seconds is 0.15 or less;

(3) The electron-accepting compound is a compound represented by the following Formula (1).

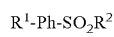

$$R^1\text{-Ph-SO}_2R^2 \qquad \text{Formula (1)}$$

In the Formula (1), $R^1$ represents a hydroxyl group or an alkyl group, $R^2$ represents -Ph, —NH-Ph, -Ph-OR$^3$ or —NH—CO—NH-Ph, $R^3$ represents an alkyl group, Ph represents a phenyl group and may be substituted with a substituent containing —SO$_2$R$^2$, and a volume-averaged grain size of the electron-donating colorless dye and electron-accepting compound is in a range of 0.5 to 1.0 μm.

According to the thermosensitive recording material which satisfies the condition (1), the image density when the thermal printing is performed with printing energy of 15.2 mJ/mm$^2$ is set to 1.20 or more. Thereby, a clear developed color image is given, and the decipherable discrimination in which the recording information can be easily made out even after a long period of time can be secured. In addition, since the recording device of which the printing speed at the time of recording is 10 cm/sec or more is used, the thermal transfer efficiency to the thermosensitive recording layer is excellent. A thermal loss can be suppressed, and the higher density image can be obtained. As a result, the printing energy at the time of recording can be reduced, and the density variation due to variation in the thermal transfer efficiency can be also prevented.

According to the thermosensitive recording material which satisfies the condition (2), the image density after the thermosensitive recording material is brought into contact with a heat source of 70° C. for 5 seconds is set to 0.15 or less. Thereby, even if the thermosensitive recording material is placed at a high temperature for a long time, no ground coloration (ground fogging) is caused. In addition, a specific sensitizer contained in the thermosensitive recording layer of the invention reduces the melt viscosity, and can satisfactorily diffuse color developing components. The high sensitivity can be effectively achieved without deteriorating the ground fogging. Therefore, the prevention of the ground fogging and the high sensitivity can be achieved.

According to the thermosensitive recording material which satisfies the condition (3), the electron-accepting compound represented by the Formula (1) is used as one of the color developing components. Thereby, the high sensitivity can be achieved while maintaining the low ground fogging, and the long term preservability of the forming image, the chemical resistance and the head matching properties of the thermal head can be improved at the same time. Since the volume-averaged grain size of the electron-donating colorless dye and electron-accepting compound is in a range of 0.5 to 1.0 μm, the high sensitivity can be achieved while maintaining the low ground fogging, and the long term preservability (moisture resistance) of the forming image, the chemical resistance, the head matching properties of the thermal head and the ink jet recording capability can be improved at the same time.

The invention also provides the thermosensitive recording material, wherein the recording device is provided with a thermal head having a partial glaze structure.

Since a low-cost recording device can be used according to the thermosensitive recording material, no obstacle caused by the head contamination is caused while being able to record at a low cost and a high speed.

The invention also provides the thermosensitive recording material, wherein a preserving rate of a formed image after printing with which a vinyl chloride resin wrap containing a plasticizer in an amount of 25% by mass or more is brought into contact, after being left for 1 hour under environmental conditions of 25° C. and a relative humidity of 50% is 50% or more.

Since the image can be stably maintained for a long period of time for daily use in the thermosensitive recording material, the thermosensitive recording material can be suitably applied in the fields such as the receipt use of a POS register, the storage of important documents, tickets for advance sale and premium tickets.

The invention also provides the thermosensitive recording material, wherein the compound represented by the Formula (1) is 4-hydroxybenzene sulfonanilide.

Since the thermosensitive recording material contains 4-hydroxybenzene sulfonanilide as the electron-accepting compound, the high sensitivity, the improvement of the image preservability and the improvement of the head matching properties can be more effectively achieved, and the increase of the ground fogging (fog density of ground portion) of the ground portion is not caused.

The invention also provides the thermosensitive recording material, wherein the thermosensitive recording layer contains an image stabilizer, and the image stabilizer is at least one compound selected from the group consisting of 1,1,3-tris(2-methyl-4-hydroxy-5-tert-butylphenyl)butane and 1,1,3-tris(2-methyl-4-hydroxy-5-cyclohexylphenyl)butane.

Since the thermosensitive recording layer contains a specific image stabilizer in the thermosensitive recording material, the shift of the coloring reaction (forward reaction) to the reverse-reaction can be suppressed, and the image preservability can be further improved. At the same time, the thermosensitive recording layer contributes to the improvement of the light fastness.

The invention also provides the thermosensitive recording material, wherein the thermosensitive recording layer contains an inorganic pigment, and the inorganic pigment is at least one compound selected from the group consisting of soft calcite calcium carbonate, amorphous silica and aluminium hydroxide.

Since the thermosensitive recording layer contains a specific inorganic pigment in the thermosensitive recording material, the head matching properties with a thermal head with which is brought into contact can be further improved, and the sealability can be also imparted at the same time.

The invention also provides the thermosensitive recording material, wherein a protective layer is formed on the thermosensitive recording layer, and the protective layer contains at least one inorganic pigment selected from the group consisting of aluminium hydroxide, kaoline and amorphous silica, and a water-soluble polymer.

Since the protective layer including the specific inorganic pigment is formed on the thermosensitive recording layer in the thermosensitive recording material, the preservability can be improved by the oil absorbency or the like, and the imparting of the handleability and sealability and sealing capability (the imparting of a plain paper-like feel) can be achieved at the same time.

The invention also provides the thermosensitive recording material, wherein the electron-donating colorless dye is at least one compound selected from the group consisting of 2-anilino-3-methyl-6-diethylaminofluorane, 2-anilino-3-methyl-6-dibutylaminofluorane, 2-anilino-3-methyl-6-(N-ethyl-N-isoamyl amino)fluorane, 2-anilino-3-methyl-6-(N-ethyl-N-propylamino)fluorane, 2-anilino-3-methyl-6-di-n-amyl amino fluorane and 2-anilino-3-methyl-6-(N-ethyl-N-p-tolyl amino)fluorane.

Since the thermosensitive recording layer contains a specific electron-donating colorless dye in the thermosensitive recording material, the high sensitivity of a higher level, the reduction of the ground fogging and the improvement of the preservability can be satisfied at the same time.

The invention also provides the thermosensitive recording material, wherein the support contains waste paper pulp.

Since the waste paper pulps are used for the support in the thermosensitive recording material, the recycling resource and the resource saving can be achieved.

The invention also provides the thermosensitive recording material, wherein a residual density rate in a formed image after being left for 24 hours under environmental conditions of 60° C. and a relative humidity of 20% after printing is 65% or more.

Since the high density forming image can be maintained for a long period of time in the thermosensitive recording material, the thermosensitive recording material can be applied in the fields demanding the long-term image reliability such as the storage of important documents, tickets for advance sale, receipt and premium tickets.

The invention also provides the thermosensitive recording material, wherein a content of the sensitizer is in a range of 75 to 200 parts by mass based on 100 parts by mass of the compound represented by the Formula (1).

Since the thermosensitive recording material contains the sensitizer of the amount being suitable for the amount of the electron-accepting compound, the high sensitivity can be effectively achieved without hindering other various performances.

The invention also provides the thermosensitive recording material, wherein the thermosensitive recording layer contains an adhesive, and the adhesive is at least one compound selected from the group consisting of sulfo-modified polyvinyl alcohol, diacetone-modified polyvinyl alcohol and acetoacetyl-modified polyvinyl alcohol.

Since the thermosensitive recording layer contains a specific water-soluble resin as an adhesive in the thermosensitive recording material, the high sensitivity of a higher level and the reduction of the ground fogging can be achieved. The printability can be also imparted at the same time by the constitution. In addition, the water resistance can be also imparted by combining with a crosslinking agent.

The invention also provides the thermosensitive recording material, wherein a total ion density of $Na^+$ ions and $K^+$ ions is 1500 ppm or less.

Since a total ion density which occupies to the whole such as the support composing the thermosensitive recording material and the layer is suppressed as the result of selecting using the material with few contents of the ion in the thermosensitive recording material, the amount of the ion deposited on the head is suppressed, and thereby the corrosion resistance (durability) of the thermal head can be improved.

The invention also provides the thermosensitive recording material, wherein after a drop of distilled water has been dropped on a surface of the thermosensitive recording layer, a contact angle thereof after a lapse of 0.1 seconds is 20° or more.

Since the contact angle of the surface of the thermosensitive recording layer is set to 20° or more in the thermosensitive recording material, the bleeding of ink at the time of ink jet recording or sealing is effectively suppressed. The ink jet capability can be imparted, and the sealability can be improved.

The invention also provides the thermosensitive recording material, wherein at least one layer formed on the support is coated and formed by a curtain coating method.

That is, since at least one layer of a plurality of layers, in particular, the thermosensitive recording layer is coated by the curtain coating method, the constituents can be concentrated on the recording surface. Thereby, the coloring density can be improved by a less amount of the material use, and the image quality can be improved. When a plurality of layers are simultaneously coated by the curtain coating method, the decrease of the consumption energy at the time of manufacturing can be also achieved.

BEST MODE FOR CARRYING OUT THE INVENTION

The thermosensitive recording material of the invention has the color-developing system thermosensitive recording layer which combines the electron-donating colorless dye and the electron-accepting compound. The image density when printing energy by the thermal head to the thermosensitive recording layer is 15.2 $mJ/mm^2$ is set to 1.20 or more, and the thermosensitive recording material is used for a recording device having a printing speed of 10 cm/sec or more.

Hereinafter the thermosensitive recording material of the present invention is specifically explained.

The thermosensitive recording material of the invention has one or two thermosensitive recording layer(s) on a substrate, and preferably has a protective layer. Furthermore, if required, the material may have other layers such as an intermediate layer, etc.

Thermosensitive Recording Layer

The thermosensitive recording layer comprises at least an electron-donating colorless dye and an electron-accepting compound that reacts with an electron-donating colorless dye to develop a color, and preferably comprises an image stabilizer (an ultraviolet light blocking agent), an inorganic pigment, an adhesive and a sensitizer. If required, the layer may comprise other components.

Electron-Donating Colorless Dye

The thermosensitive recording layer used for the invention comprises an electron-donating colorless dye as a color-developing component. The electron-donating colorless dye can be selected from conventionally known dyes, and for example, 2-anilino-3-methyl-6-diethylaminofluorane, 2-anilino-3-methyl-6-dibutylaminofluorane, 2-anilino-3-methyl-6-(N-ethyl-N-isoamylamino)fluorane, 2-anilino-3-methyl-6-(N-ethyl-N-propylamino)fluorane, 2-anilino-3-methyl-6-di-n-amylaminofluorane, 2-anilino-3-methyl-6-(N-ethyl-N-p-tolylamino)fluorane, 2-anilino-3-methyl-6-N-ethyl-N-sec-butylaminofluorane, 3-di-(n-pentylamino)-6-methyl-7-anilinofluorane, 3-(N-isoamyl-N-ethylamino)-6-methyl-7-anilinofluorane, 3-(N-n-hexyl-N-ethylamino)-6-methyl-7-anilinofluorane, 3-[N-(3-ethoxypropyl)-N-ethylamino]-6-methyl-7-anilinofluorane, 3-di-(n-butylamino)-7-(2-chloroanilino)fluorane, 3-diethylamino-7-(2-chloroanilino)fluorane, 3-(N-cyclohexyl-N-methylamino)-6-methyl-7-anilinofluorane, etc., can be exemplified.

Among these, it is specifically preferable to use at least one compound selected from the group consisting of 2-anilino-3-methyl-6-diethylaminofluorane, 2-anilino-3-methyl-6-dibutylaminofluorane, 2-anilino-3-methyl-6-(N-ethyl-N-isoamylamino)fluorane, 2-anilino-3-methyl-6-(N-ethyl-N-propylamino)fluorane, 2-anilino-3-methyl-6-di-n-amylaminofluorane and 2-anilino-3-methyl-6-(N-ethyl-N-p-tolylamino)fluorane. In addition, these electron-donating colorless dyes can be used solely or in combination of two or more in a single thermosensitive recording layer.

Specifically, since the layer comprises at least one dye selected from the above-mentioned group as an electron-donating colorless dye, color development density can be increased while keeping background fogging low. In addition, it can further improve image retention property of the simultaneously-formed image part.

During preparation of a coating solution for forming a thermosensitive recording layer (hereinafter sometimes referred to as "coating solution for a thermosensitive recording layer"), the particle size (volume average particle size) of the electron-donating colorless dye is preferably not more than 1.0 μm, and more preferably 0.4–0.7 μm. When the volume average particle size exceeds 1.0 μm, heat sensitivity sometimes decreases, and when the volume average particle size is less than 0.4 μm, background fogging sometimes deteriorates.

The volume average particle size can be measured easily by a laser diffraction type size distribution measuring instrument (e.g., trade name: LA500, manufactured by Horiba, Inc.), etc.

The coating amount of the electron-donating colorless dye is preferably 0.1–1.0 g/m$^2$, and more preferably 0.2–0.5 g/m$^2$ in view of color development density and background fogging.

Electron-Accepting Compound

The thermosensitive recording layer used for the invention comprises an electron-accepting compound that reacts with the electron-donating colorless dye during heating to develop a color. The present invention preferably comprises at least one a compound represented by the following Formula (1).

$R^1$-Ph-SO$_2$R$^2$  Formula (1)

In the Formula (1), $R^1$ represents a hydroxyl group or an alkyl group, $R^2$ represents -Ph, —NH-Ph, -Ph-OR$^3$ or —NH—CO—NH-Ph, and $R^3$ represents an alkyl group, wherein Ph represents a phenyl group, which is optionally substituted by a substituent comprising —SO$_2$R$^2$.

The alkyl group represented by $R^1$ is preferably an alkyl group having 1 to 3 carbon atoms, and more preferably a methyl group, an ethyl group, an isopropyl group, etc. Among these, $R^1$ is specifically preferably a hydroxyl group.

The $R^3$ represents an alkyl group, and the alkyl group is preferably an alkyl group having 1–4 carbon atoms, and specifically preferably an isopropyl group, etc. Ph may be a substituted phenyl group wherein the phenyl group is substituted by the "substituent comprising —SO$_2$R$^2$", and the $R^2$ of the substituent may be substituted with a methyl group, a halogen atom, etc. The substituent includes —CH$_2$—C$_6$H$_5$—NHCONH—SO$_2$—C$_6$H$_5$, —SO$_2$—C$_6$H$_5$, —SO$_2$—C$_6$H$_4$—CH$_3$, —SO$_2$—C$_6$H$_4$—Cl, etc.

Among these, $R^2$ is preferably —NH-Ph, and specifically preferably —NH—C$_6$H$_5$.

Preferable examples of the compound represented by the Formula (1) include 4-hydroxybenzenesulfoneanilide (=p-N-phenylsulfamoylphenol), p-N-(2-chlorophenyl)sulfamoylphenol, p-N-3-tolylsulfamoylphenol, p-N-2-tolylsulfamoylphenol, p-N-(3-methoxyphenyl)sulfamoylphenol, p-N-(3-hydroxyphenyl)sulfamoylphenol, p-N-(4-hydroxyphenyl)sulfamoylphenol, 2-chloro-4-N-phenylsulfamoylphenol, 2-chloro-4-N-(3-hydroxyphenyl)sulfamoylphenol, 4'-hydroxy-p-toluenesulfoneanilide, 4,4'-bis(P-toluenesulfonylaminocarbonylamino)diphenylmethane (=BTUM), 4-hydroxy-4'-isopropoxydiphenylsulfone, 2,4-bis (phenylsulfonyl)phenol, and the like. However, in the invention, the compound is not limited to these compounds.

Among the electron-accepting compounds represented by the Formula (1), 4-hydroxybenzenesulfoneanilide is the most preferable in view of the balance between image retention property and background fogging.

A content of the electron-accepting compound in a single thermosensitive recording layer is preferably 50–400% by mass, more preferably 100–300% by mass relative to the mass of the electron-donating colorless dye.

Besides the electron-accepting compound represented by the Formula (1), other known electron-accepting compounds may be used in combination so long as the effects of the invention are not deteriorated.

The above-mentioned known electron-accepting compound is preferably a phenolic compound or a salicylic acid derivative or a polyhydric metal salt thereof since they can be used by suitable selection and specifically, they suppress background fogging.

The phenolic compound includes, for example, 2,2'-bis(4-hydroxyphenol)propane (bisphenol A), 4-t-butylphenol, 4-phenylphenol, 4-hydroxydiphenoxide, 1,1'-bis(4-hydroxyphenyl)cyclohexane, 1,1'-bis(3-chloro-4-hydroxyphenyl)cyclohexane, 1,1'-bis(3-chloro-4-hydroxyphenyl)-2-ethylbutane, 4,4'-sec-isoctylidenediphenol, 4,4'-sec-butylidenediphenol, 4-tert-octylphenol, 4-p- methylphenylphenol, 4,4'-methylcyclohexylidenephenol, 4,4'-isopentylidenephenol, 4-hydroxy-4-isopropyloxydiphenylsulfone, p-hydroxybenzylbenzoate, etc.

The salicylic acid derivative includes, for example, 4-pentadecylsalicylic acid, 3,5-di-(α-methylbenzyl)salicylic acid, 3,5-di-(tert-octyl)salicylic acid, 5-octadecylsalicylic acid, 5-α-(p-α-methylbenzylphenyl)ethylsalicylic acid, 3-α-methylbenzyl-5-tert-octylsalicylic acid, 5-tetradecylsalicylic acid, 4-hexyloxysalicylic acid, 4-cyclohexyloxysalicylic acid, 4-decyloxysalicylic acid, 4-dodecyloxysalicylic acid, 4-pentadecyloxysalicylic acid, 4-octadecyloxysalicylic acid, etc., and a zinc salt, an aluminum salt, a calcium salt, a copper salt or a lead salt thereof, etc.

When the above-mentioned known electron-accepting compound is used in combination, a content of the electron-accepting compound represented by the Formula (1) is preferably not less than 50% by mass, and specifically preferably not less than 70% by mass relative to the total mass of the electron-accepting compound.

During the preparation of the coating solution for forming the thermosensitive recording layer, the particle size (volume average particle size) of the electron-accepting compound is preferably not more than 1.0 µm, and more preferably 0.4–0.7 µm. When the volume average particle size exceeds 1.0 µm, heat sensitivity sometimes decreases. When the volume average particle size is less than 0.4 µm, background fogging sometimes deteriorates. In the second aspect of the invention, the volume average particle size is 1.0 µm. Generally, when the particle size decreases, background fogging tends to increase. However, background whiteness is not deteriorated in the invention even small particle size of less than 1.0 µm is used.

The volume average particle size can be also measured readily using a laser diffraction type size distribution measuring instrument (e.g., trade name: LA500, manufactured by Horiba, Inc.), etc.

Sensitizer

The thermosensitive recording layer used for the invention preferably includes a sensitizer. Specifically, in view of capacity of further improvement of sensitivity, the layer preferably includes at least one compound selected from the group consisting of 2-benzyloxynaphthalene, dimethylbenzyl oxalate, m-terphenyl, ethyleneglycol tolyl ether, p-benzylbiphenyl, 1,2-diphenoxymethylbenzene, 1,2-diphenoxyethane and diphenylsulfone (hereinafter sometimes referred to as "sensitizer used for the invention").

The total content of the sensitizer to be selected for the thermosensitive recording layer is preferably 75–200 parts by mass, and more preferably 100–150 parts by mass relative to 100 parts by mass of the electron-accepting compound (preferably 4-hydroxybenzenesulfoneanilide).

When the content is in the above-mentioned range, the effect of improvement of sensitivity can be increased. Furthermore, image retention property, heat resistance and moisture resistance can be improved.

Besides the sensitizer selected from the above-mentioned group, other sensitizer selected from conventionally known ones can be used in combination so long as the effects of the invention is not deteriorated.

When the above-mentioned other sensitizer is used in combination, the amount of the sensitizer selected from the above-mentioned group is preferably not less than 50% by mass, and more preferably not less than 70% by mass relative to the total amount of the sensitizer included in the layer.

The above-mentioned other sensitizer includes, for example, aliphatic monoamide, aliphatic bisamide, stearylurea, p-benzylbiphenyl, di(2-methylphenoxy)ethane, di(2-methoxyphenoxy)ethane, β-naphthol(p-methylbenzyl)ether, α-naphthylbenzylether, 1,4-butanediol-p-methylphenylether, 1,4-butanediol-p-isopropylphenylether, 1,4-butanediol-p-tert-octylphenylether, 1-phenoxy-2-(4-ethylphenoxy) ethane, 1-phenoxy-2-(chlorophenoxy)ethane, 1,4-butanediolphenylether, diethyleneglycolbis(4-methoxyphenyl)ether, 1,2-diphenoxymethylbenzene, 1,4-bis(phenoxymethyl)benzene, etc.

Image Stabilizer (Ultraviolet Light Absorber)

The thermosensitive recording layer used for the invention preferably comprises an image stabilizer (inclusive of an ultraviolet light absorber). The ultraviolet light absorber may be incorporated in microcapsules. By incorporating the image stabilizer, the storage property of the developed image (image retention property) can be further improved.

As the above-mentioned image stabilizer, for example, a phenol compound, specifically a hindered phenol compound is effective, and which includes, for Example 1-1,3-tris(2-methyl-4-hydroxy-5-tert-butylphenyl)butane, 1,1,3-tris(2-methyl-4-hydroxy-5-cyclohexylphenyl)butane, 1,1,3-tris(2-ethyl-4-hydroxy-5-cyclohexylphenyl)butane, 1,1,3-tris(3,5-di-tert-butyl-4-hydroxyphenyl)butane, 1,1,3-tris(2-methyl-4-hydroxy-5-tert-butylphenyl)propane, 2,2'-methylenebis(6-tert-butyl-4-methylphenol), 2,2'-methylenebis(6-tert-butyl-4-ethylphenol), 4,4'-butylidenebis(6-tert-butyl-3-methylphenol), 4,4'-thiobis(3-methyl-6-tert-butylphenol), etc. These image stabilizers can be used solely or in combination of two or more kinds.

Among these, 1,1,3-tris(2-methyl-4-hydroxy-5-tert-butylphenyl)butane and 1,1,3-tris(2-methyl-4-hydroxy-5-cyclohexylphenyl)butane are specifically preferred.

The total content of the image stabilizer in a single thermosensitive recording layer is preferably 10–100 parts by mass, and more preferably 20–60 parts by mass in view of suppression of background fogging and effective improvement of image retention property, heat resistance and moisture resistance.

Alternatively, when the above-mentioned image stabilizer other than these image stabilizers is used in combination of 1,1,3-tris(2-methyl-4-hydroxy-5-tert-butylphenyl)butane and/or 1,1,3-tris(2-methyl-4-hydroxy-5-cyclohexylphenyl) butane, a content of 1,1,3-tris(2-methyl-4-hydroxy-5-tert-butylphenyl)butane and/or 1,1,3-tris(2-methyl-4-hydroxy-5-cyclohexylphenyl)butane in a single thermosensitive recording layer is preferably 50% by mass, and more preferably 70% by mass relative to the total mass of the image stabilizer.

The ultraviolet light absorber can include the ultraviolet light absorbers as shown below.

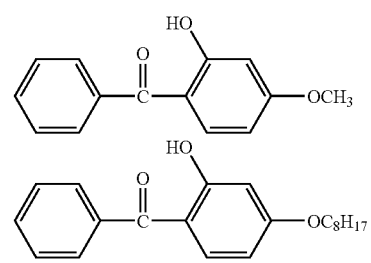

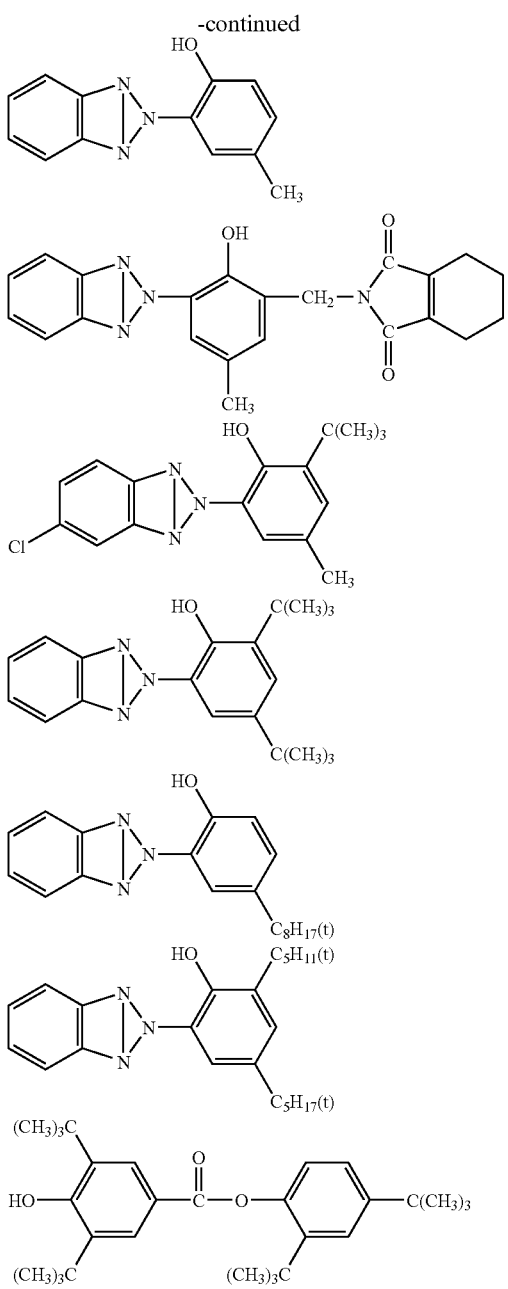

In view of effectively improving an image retention property, a content of the ultraviolet light absorber in a single thermosensitive recording layer is preferably 10–300 parts by mass, more preferably 30–200 parts by mass relative to 100 parts by mass of the electron-donating colorless dye.

Inorganic Pigment

The thermosensitive recording layer used for the invention preferably comprises, as an inorganic pigment, specifically at least one compound selected from calcite calcium carbonate, amorphous silica and aluminum hydroxide (inorganic pigments used for the invention). By incorporating the inorganic pigment, head matching property with the thermal head to which the layer contacts can be improved. At the same time, stamping applicability, printing applicability and plain paper-like property can be provided.

(Light) calcium carbonate is generally in crystalline form such as calcite, aragonite, baterite, etc. Among these, calcite (light) calcium carbonate is preferred in view of prevention of color development density and head contamination after recording by a thermal head and in view of absorbing property, hardness, etc. Among these, those having particle shape of spindle-shaped and scalenohedron-surface are specifically preferred. The calcite (light) calcium carbonate can be prepared by a conventional preparation method.

The average particle size (volume average particle size) of the calcite (light) calcium carbonate is preferably 1–3 µm. The volume average particle size can be measured according to a similar manner to those for the above-mentioned electron-donating colorless dye, etc.

A content of the "inorganic pigment used for the invention" in a single thermosensitive recording layer is preferably 50–500 parts by mass, more preferably 70–350 parts by mass, and specifically preferably 90–250 parts by mass relative to 100 parts by mass of the electron-accepting compound in view of improvement of color development density and prevention of adhesion of residues to a thermal head.

Furthermore, other inorganic pigment can be used in combination with the above-mentioned inorganic pigment used for the invention to the extent that the effects of the invention (specifically improvement of head matching property, printing applicability and plain paper-like property) are not deteriorated.

The above-mentioned other inorganic pigment includes calcium carbonates other than calcite (light) calcium carbonate, barium sulfate, lithpone, talc, kaolin, calcined kaolin, amorphous silica, kaolin, magnesium carbonate, magnesium oxide, etc.

The volume average particle size of the other inorganic pigment measured by a laser diffraction type size distribution measuring instrument (e.g., trade name: LA500, manufactured by Horiba, Inc., etc.) is preferably 0.3–1.5 µm, and more preferably 0.5–0.9 µm.

When the inorganic pigment used for the invention is used in combination with the other inorganic pigment, the ratio of the total mass (V) of the "inorganic pigment used for the invention" and the total mass (W) of the other inorganic pigment (V/W) is preferably 100/0-60/40, and more preferably 100/0-80/20.

Furthermore, an inorganic pigment having Mohs hardness of not more than 3 is preferred in view of suppression of abrasion of a thermal head. The "Mohs hardness" means Mohs hardness described in "English-Japanese Plastic Industrial Dictionary 5$^{th}$ issue p. 616" (Shin Ogawa, Kogyo Chosakai Publishing Co., Ltd.). The inorganic pigment having Mohs hardness of not more than 3 includes calcium carbonate, aluminum hydroxide, etc.

Use of the inorganic pigment used for the invention as a mixture with magnesium carbonate and/or magnesium oxide is preferable since it is effective for suppression of background fogging. A content of magnesium carbonate and/or magnesium oxide is preferably 3–50% by mass, and specifically 5–30% by mass of relative to the total mass of the organic pigment.

Adhesive

The thermosensitive recording layer used for the invention preferably comprises at least one compound selected from sulfo-modified polyvinyl alcohol, diacetone-modified polyvinyl alcohol and acetoacetyl-modified polyvinyl alcohol (i.e., modified polyvinyl alcohols (hereinafter sometimes referred to as "specific modified PVA") as an adhesive (or a protective colloid for dispersion). By incorporating the specific modified PVA in the thermosensitive recording layer as an adhesive, plain paper-like feeling can be provided, and adhesive force between the thermosensitive recording layer and the substrate can be increased to prevent troubles such as peeling of paper that occurs during offset printing, etc., which can lead to improvement of printing applicability. Furthermore, color development density when recorded with a thermal head can be increased while suppressing background fogging during recording.

The above-mentioned specific modified PVAs can be used solely or in combination, or in combination with other modified PVA or polyvinyl alcohol (PVA).

When the above-mentioned other modified PVA or PVA is used in combination, the ratio of the above-mentioned specific modified PVA is preferably not less than 10% by mass, and more preferably not less than 20% by mass relative to the total mass of the adhesive component.

The above-mentioned specific modified PVA is preferably one having a saponification degree of 85–99% by mole.

When the above-mentioned saponification degree is less than 85% by mole, the water resistance against wetting water to be used during offset printing becomes insufficient, which sometimes results in so-called peeling of paper. On the other hand, when the amount of the modified PVA to be added is increased aiming at avoiding such peeling of paper, color development density sometimes decreases. Furthermore, when the above-mentioned saponification degree exceeds 99% by mole, unsolved products are easily produced during the preparation of a coating solution, which sometimes results in bad coating property.

For the purpose of avoiding deterioration of the effect of the invention, when the other modified PVA and/or PVA is(are) used in combination, the saponification degree(s) of the other modified PVA and/or PVA is(are) preferably in the above-mentioned range.

Specifically, the polymerization degree of the above-mentioned specific modified PVA is preferably 200–2000.

When the above-mentioned polymerization degree is less than 200, peeling of paper easily occurs during offset printing. Furthermore, when the amount to be added is increased aiming at avoiding peeling of paper, color development density sometimes decreases. Furthermore, when the above-mentioned polymerization degree exceeds 2000, the modified PVA becomes hardly-soluble in a solvent (water), and the viscosity of liquid during preparation increases, which makes preparation of a coating solution for forming a thermosensitive recording layer and the application thereof difficult.

For the purpose of avoiding deterioration of the effect of the invention, when the other modified PVA and/or PVA is(are) used in combination, the polymerization degree(s) of the other modified PVA and/or PVA is(are) preferably in the above-mentioned range.

The polymerization degree as used herein refers to the average polymerization degree obtained by the method described in JIS-K6726 (1994).

A content of the specific modified PVA in the thermosensitive recording layer is preferably 30–300 parts by mass, more preferably 70–200 parts by mass, and specifically preferably 100–170 parts by mass relative to 100 parts by mass of the electron-donating colorless dye in view of improvement of color development density and provision of offset printing applicability (prevention of peeling of paper, etc.).

The above-mentioned specific modified PVA functions not only as an adhesive for increasing adhesive force between the layers but also as a dispersing agent, a binder, etc.

Secondly, each of the specific modified PVAs, i.e., sulfo-modified polyvinyl alcohol, diacetone-modified polyvinyl alcohol and acetoacetyl-modified polyvinyl alcohol are specifically explained.

The above-mentioned sulfo-modified polyvinyl alcohol can be prepared by a method comprising copolymerizing an olefinsulfonic acid or a salt thereof such as ethylenesulfonic acid, allylsulfonic acid, methallylsulfonic acid, etc. with a vinylester such as vinyl acetate, etc. in an alcohol or a mixed solvent of an alcohol and water to give a polymer and saponifying the obtained polymer; a method comprising copolymerizing an amide sodium salt and a vinyl ester such as vinyl acetate, etc. and saponifying the obtained polymer; a method comprising treating PVA with bromine, iodine, etc. and heating the treated PVA in an acidic aqueous sodium sulfite solution; a method comprising heating PVA in a concentrated aqueous sulfuric acid solution, or a method comprising acetalating PVA with an aldehyde compound comprising a sulfonic acid group, etc.

The above-mentioned diacetone-modified polyvinyl alcohol is a partial or complete saponified product of a copolymer of a monomer having diacetone group and a vinyl ester, which can be prepared by a method comprising copolymerizing a monomer having diacetone group and a vinyl ester to give a resin and saponifying the obtained resin.

The ratio of the monomer having diacetone group in the above-mentioned diacetone-modified polyvinyl alcohol (repeating unit structure) is not specifically limited.

The above-mentioned acetoacetyl-modified polyvinyl alcohol can be generally prepared by adding liquid or gaseous diketene to a solution, a dispersion liquid or powder of a polyvinyl alcohol resin to react the diketene with the resin. The acetylation degree of the acetoacetyl-modified polyvinyl alcohol can be suitably selected according to the desired quality of the objective thermosensitive recording material.

Other Component

The thermosensitive recording layer used for the invention may include, according to the purpose and need, other components such as a cross-linking agent, other pigment, a metal soap, wax, a surfactant, a binder, an antistatic agent, a defoaming agent, a fluorescence dye, etc. besides the above-mentioned components.

Cross-Linking Agent

The thermosensitive recording layer may include a cross-linking agent that reacts with the above-mentioned specific modified PVA used as an adhesive (or a protective colloid) and other modified PVA, etc. By incorporating such cross-linking agent, water resistance of the thermosensitive recording material can be improved.

The above-mentioned cross-linking agent can be suitably selected from cross-linking agents those can cross-link a specific modified PVA (and preferably the above-mentioned other modified PVA, etc.). Among these, aldehyde compounds such as glyoxal, etc., dihydrazide compounds such as adipic acid dihydrazide, etc. are specifically preferred.

A content of the cross-linking agent in the thermosensitive recording layer is preferably 1–50 parts by mass, and more preferably 3–20 parts by mass relative to 100 parts by mass of the specific modified PVA or other modified PVA, etc., to be cross-linked. When a content of the cross-linking agent is in the above-mentioned range, water resistance can be improved effectively.

Dye Mordant

The thermosensitive recording layer may include a dye mordant for the purpose of preventing bleeding after ink jet recording.

The above-mentioned dye mordant includes a compound having at least one cation group selected from an amide group, an imide group, a primary amino group, a secondary amino group, a tertiary amino group, a primary ammonium salt group, a secondary ammonium salt group, a tertiary ammonium salt group and a quatenary ammonium salt group.

Specific examples thereof include polyamide epichlorohydrin, polyvinylbenzyltrimethylammonium chloride, polydiallyldimethylammonium chloride, polymethacryloyloxyethyl-β-hydroxyethyldimethylammonium chloride, polydimethylaminoethylmethacrylate hydrochloride, polyethyleneimine, polyallylamine, polyallylamine hydrochloride, polyamide-polyamine resin, cationated starch, dicyanodiamide-formalin condensate, dimethyl-2-hydroxypropylammonium salt polymer, etc.

Beside the above-mentioned polymers, cationic polymers are also preferred. Such cationic polymer includes, for example, polyethyleneimine, polydiallylamine, polyallylamine, polydiallyldimethylammonium chloride, polymethacryloyloxyethyl-β-hydroxyethyldimethylammonium chloride, polyallylamine hydrochloride, polyamide-polyamine resin, cationated starch, dicyanodiamide formalin condensate, dimethyl-2-hydroxypropylammonium salt polymer, polyamidine, polyvinylamine, etc.

The molecular weight of the above-mentioned dye mordant is preferably about 1000–200000. When the molecular weight is less than 1000, water resistance tends to become insufficient, and when the molecular weight exceeds 200000, viscosity increases, which sometimes leads to bad handling applicability.

The above-mentioned cationic polymer may be added to either the thermosensitive recording layer or the protective layer mentioned below.

Metal Soap, Wax and Surfactant

The metal soap includes a higher fatty acid metal salt, specifically zinc stearate, calcium stearate, stearate aluminum, etc.

The wax includes such as paraffin wax, microcrystalline wax, carnauba wax, methylolstearoamide, polyethylene wax, polystyrene wax and fatty acid amide wax, etc. These can be used solely or in combination of two or more kinds.

The surfactant includes such as a sulfosuccinic acid alkali metal salt, fluorine-containing surfactant, etc.

Binder

The above-mentioned electron-donating colorless dye, electron-accepting compound, inorganic pigment, adhesive and sensitizer, and the other components can be suitably dispersed in a water soluble binder. The binder as used herein is preferably a compound that can dissolve by not less than 5% by mass in 25° C. water. The binder specifically includes such as polyvinyl alcohol, methylcellulose, carboxymethylcellulose, starchs (inclusive of modified starchs), gelatin, gum arabic, casein, a saponified product of styrene-maleic anhydride copolymer, etc.

The above-mentioned binder not only functions to improve film strength during dispersion but also functions to improve film strength of the thermosensitive recording layer.

For exhibiting such function, synthetic polymer latex binders such as styrene-butadiene copolymer, vinyl acetate copolymer, acrylonitrile-butadiene copolymer, methyl acrylate-butadiene copolymer, polyvinylidene chloride, etc. can be used in combination.

Others

The above-mentioned electron-donating colorless dye, electron-accepting compound, inorganic pigment, adhesive and sensitizer can be formed into a coating solution by simultaneously or separately dispersing them using a stirrer with a crusher such as a ball mill, an attriter, a sand mill, etc. If neccesary, the above-mentioned other components, i.e., a cross-linking agent, a dye mordant, a metal soap, wax, a surfactant, a binder, an antistatic agent, a defoaming agent, and a fluorescence dye, etc. are added to the coating solution.

The coating solution is prepared as above and applied on a surface of a substrate, whereby a thermosensitive recording layer is formed. The coating method for applying a coating solution is not specifically limited, and may be suitably selected from coating methods such as using an air knife coater, a roll coater, a blade coater, a curtain coater, etc. After the application, the coating solution is dried, and the dried coating is subjected to smoothing treatment preferably by calendar treatment and used.

The dried coating amount of the coating solution for applying and forming a thermosensitive recording layer is not specifically limited, however, ordinally preferably in a range of 2 to 7 g/m$^2$.

In the invention, curtain coating method using a curtain coater is specifically preferred, because high density (high sensitivity) can be obtained by smaller amount of the material, and image quality (image quality) can be improved simultaneously. Furthermore, when a protective layer, etc. other than the thermosensitive recording layer are-laminated as mentioned below, the energy consumed during preparation can be further decreased by applying multiple layer simultaneously by curtain coating method as specifically mentioned below.

The thermosensitive recording material is preferably prepared by curtain coating method comprising applying single or multiple kind of coating solution(s) on the surface of the substrate to form a part or whole of the multiple layer to be provided on the substrate and drying the formed layer. The kind of the layer formed by curtain coating method is not specifically limited, and includes such as a primer layer, a thermosensitive recording layer, a protective layer, etc. The embodiment wherein these adjacent series of layers are applied by curtain coating method simultaneously is also preferred.

Specific examples of the combination of the layers to be applied simultaneously includes, but is not limited to, a combination of a primer layer and a thermosensitive recording layer, a combination of a thermosensitive recording layer and a protective layer, a combination of a primer layer, a thermosensitive recording layer and a protective layer, a combination of two or more of different kinds of primer layers, a combination of two or more of different kinds of thermosensitive recording layers, a combination of two or more of different kinds of protective layers, etc.

The curtain coating method apparatus to be used for curtain coating method includes, but is not limited to, an extrusion hopper type curtain coating method apparatus, a slide hopper type curtain coating method apparatus, etc. Among these, a slide hopper type curtain coating method apparatus described in Japanese Patent Application Publication (JP-B) No. 49-24133, which is used for preparation of a photosensitive material for photography, is specifically preferred. By using the slide hopper type curtain coating method apparatus plural of layers can be readily applied simultaneously.

The image density after heat photographic printing by applying the above-mentioned energy can be adjusted to not less than 1.20 by suitably selecting the above-mentioned components, construction of the layers, coating method, etc. specifically particle sizes, kinds and amounts of the electron-accepting compound and the electron-donating colorless dye, presence or absence of a protective layer, etc., according to a preferred embodiment. In the invention, the image density obtained by applying the above-described energy is preferably 1.25–1.35.

Protective Layer

The thermosensitive recording layer preferably comprises at least one protective layer thereon. The protective layer may include organic or inorganic micropowder, a binder, a surfactant, a thermoplastic substance, etc.

The above-mentioned micropowder includes, for example, inorganic micropowder such as calcium carbonate, silicas, zinc oxide, titanium oxide, aluminum hydroxide, zinc hydroxide, barium sulfate, kaolin, clay, talc, surface-treated calcium or silica, etc., organic micropowder such as urea-formalin resin, styrene/methacrylic acid copolymer, polystyrene, etc.

The binder to be included in the protective layer can include, for example, polyvinyl alcohol, carboxy-modified polyvinyl alcohol, vinyl acetate-acrylamide copolymer, silicon-modified polyvinylalcohol, starch, modified starch, methylcellulose, carboxymethylcellulose, hydroxymethylcellulose, gelatins, gum arabic, casein, styrene-maleic acid copolymer hydrolysate, polyacrylamide derivative and polyvinylpyrrolidone, and latexes such as styrene-butadiene rubber latex, acrylonitrile-butadiene rubber latex, methyl acrylate butadiene rubber latex, vinyl acetate emulsion, etc.

Alternatively, an embodiment wherein a waterproof agent for cross-linking a binder component in a protective layer is added to a protective layer so as to further improve storage and stabilization property of a thermosensitive recording material is also preferred. The waterproof agent includes, for example, water soluble initial condensates such as N-methylolurea, N-methylolmelamine, urea-formalin, etc., dialdehyde compounds such as glyoxal, glutalaldehyde, etc., inorganic cross-linking agents such as boric acid, boric sand, colloidal silica, etc., polyamide epichlorohydrin, etc.

Among these, specifically preferable protective layer is an embodiment comprising at least one inorganic pigment selected from aluminum hydroxide, kaolin and amorphous silica and a water soluble polymer. By constituting such embodiment, storage property can be improved, and handling property and stamping applicability can be also provided. In addition, the embodiment may also include a surfactant, a thermoplastic substance, etc.

The volume average particle size of the inorganic pigment to be included in a protective layer is preferably 0.5–3 µm, and more preferably 0.7–2.5 µm. Specifically, aluminum hydroxide having the volume average particle size of 0.5–1.2 µm is preferred in view of improvement of stamping applicability, and amorphous silica is preferred in view of improvement of ink jet applicability. The volume average particle size can be measured according to a similar manner to that for the above-mentioned electron-donating colorless dye, etc.

The total content of the inorganic pigment selected from aluminum hydroxide, kaolin and amorphous silica is preferably 10–90% by mass, and more preferably 30–70% by mass relative to the total solid content of the coating solution for forming a protective layer. Furthermore, other pigments such as barium sulfate, zinc sulfate, talc, clay, colloidal silica, etc. can be used in combination so long as the effects of the invention (specifically improvement of storage property, and provision of handling property and stamping applicability) are not deteriorated.

The above-mentioned water soluble polymer includes, among the above-mentioned binders, polyvinyl alcohol or modified polyvinyl alcohols (hereinafter generally referred to as "polyvinyl alcohol"), starch or modified starches such as oxidized starch, urea phosphate esterified starch, etc., carboxyl group-containing polymers such as styrene-maleic anhydride copolymer, styrene-maleic anhydride copolymer alkyl esterified product, styrene-acrylic acid copolymer, etc. Among these, polyvinyl alcohol, oxidized starch, urea phosphate esterified starch are preferred in view of stamping applicability, and a mixture of polyvinyl alcohol (x) and oxidized starch and/or urea phosphate esterified starch (y) having the mass ratio (x/y) of 90/10 to 10/90 is specifically preferred. Specifically, when the above-mentioned polyvinyl alcohol, oxidized starch and urea phosphate esterified starch are used in combination, the mass ratio ($y^1/y^2$) of oxidized starch ($y^1$) and urea phosphate esterified starch ($y^2$) is preferably 10/90 to 90/10.

The above-mentioned modified polyvinyl alcohol is preferably acetoacetyl-modified polyvinyl alcohol, diacetone-modified polyvinyl alcohol, silicon modified polyvinyl alcohol and amide-modified polyvinyl alcohol. In addition, sulfo-modified polyvinyl alcohol, carboxy-modified polyvinyl alcohol, etc. are also used.

Furthermore, use of a cross-linking agent that reacts with the polyvinylalcohol in combination can improve storage property, handling property and stamping applicability.

The ratio of the above-mentioned water soluble polymer is preferably 10–90% by mass, and more preferably 30–70% by mass relative to the total solid content (mass) of the coating solution for forming a protective layer.

The cross-linking agent for cross-linking the above-mentioned water soluble polymer preferably includes, polyhydric amine compounds such as ethylenediamine, etc., polyhydric aldehyde compounds such as glyoxal, glutalaldehyde, dialdehyde, etc., dihydrazide compounds such as adipic acid dihydrazide, phthalic acid dihydrazide, etc., water soluble methylol compounds (urea, melamine and phenol), multifunctional epoxy compounds, polyhydric metal salts (Al, Ti, Zr, Mg, etc.), etc. Among these, polyhydric aldehyde compounds, di-hydrazide compounds are preferred.

The content ratio of the above-mentioned cross-linking agent is preferably about 2–30% by mass, and more preferably 5–20% by mass relative to the mass of the above-mentioned water soluble polymer. By incorporating the cross-linking agent, film strength, water resistance, etc. can be further improved.

The mixing ratio of the inorganic pigment selected from aluminum hydroxide, kaolin and amorphous silica and the water soluble polymer in the protective layer is, although it varies depending on the kind and the particle size of the inorganic pigment, kind of the water soluble polymer, etc., preferably 50–400% by mass, and more preferably 100–250% by mass of the amount of the water soluble polymer relative to the mass of the inorganic pigment.

The total mass of the inorganic pigment and the water soluble polymer in the protective layer is preferably not less than 50% by mass of the total solid content mass of the protective layer.

Alternatively, in view of improvement of ink jet ink applicability, an embodiment in which a surfactant is added to the above-mentioned protective layer, i.e., to a coating solution for forming a protective layer (hereinafter sometimes referred to as "coating solution for protective layer") is also preferred.

The above-mentioned surfactant preferably includes alkylbenzenesulfonic acid salts such as sodium dodecylbenzenesulfonate, etc., sulfosuccinic acid alkyl ester salts such as sodium dioctylsulfosuccinate, etc., polyoxyethylenealkyletherphosphate ester, sodium hexametaphosphate, perfluoroalkylcarboxylate, etc. Among these, sulfosuccinic acid alkyl ester salt is more preferred.

The content ratio of the above-mentioned surfactant is preferably 0.1–5% by mass, and more preferably 0.5–3% by mass relative to the total solid content (mass) of the coating solution for forming a protective layer.

The coating solution for a protective layer can be prepared by dissolving or dispersing the above-mentioned inorganic pigment selected from aluminum hydroxide, kaolin and amorphous silica and water soluble polymer, and if required, a cross-linking agent, a surfactant, etc. in a desired aqueous solvent. The coating solution may include a lubricant, a defoaming agent, a fluorescent brightening agent, a colored organic pigment, etc. so long as the effects of the invention (specifically improvement of storage property and provision of handling property and stamping applicability) are not deteriorated.

The above-mentioned lubricant includes, for example, metal soaps such as zinc stearate, calcium stearate, etc., waxes such as paraffin wax, microcrystalline wax, carnauba wax, synthetic polymer wax, etc.

Substrate

Conventionally known substrates can be applied for the above-mentioned substrate. Specifically, substrates such as paper substrates such as quality paper, etc., coated paper comprising paper and a resin or a pigment applied thereon, resin laminate paper, quality paper having a primer layer, synthetic paper, plastic film, etc. are exemplified. A substrate comprising recycled pulp as a main component, i.e. a substrate wherein 50% by mass of the substrate consists of recycled pulp, can be also used.

The above-mentioned substrate is preferably a smooth substrate having a smoothness degree in a range of 300 seconds to 500 seconds defined by JIS-P8119 in view of dot reproducibility. Furthermore, for the same reason, the smoothness degree of the substrate defined by JIS-P8119 is not less than 100 seconds, and more preferably not less than 150 seconds.

The above-mentioned recycled pulp is made by the combination of the following three steps 1) to 3).

1) Solution . . . treating recycled paper using a pulper to form fibers by mechanical force and a chemical agent, and peeling the ink printed on the fibers.

2) Dust cleaning . . . removing foreign substances (plastic, etc.) and dusts contained in recycled paper.

3) Deinking . . . removing the printed ink peeled from the fibers out of the system by floatation method or washing method.

If desired, bleaching can be carried out simultaneously with deinking or in another step.

Using the thus-obtained recycled pulp (100% by mass) or a mixture of recycled pulp and virgin pulp (content less than 50% by mass), a substrate for a thermosensitive recording material conventional method is formed.

The above-mentioned substrate may comprise a primer layer. In this case, the primer layer is preferably provided on a surface of a substrate having the Stockigt size of not less than 5 seconds, and the primer layer preferably comprises a pigment and a binder as main components.

As the pigment for a primer layer, all of general inorganic or organic pigments can be used, and an oil-absorbing pigment having oil-absorbing degree defined by JIS-K5101 of not less than 40 ml/100 g (cc/100 g) is specifically preferred. Specific examples of the oil-absorbing pigment include calcined kaolin, aluminum oxide, magnesium carbonate, calcined diatomaceous earth, aluminum silicate, magnesium aluminosilicate, calcium carbonate, barium sulfate, aluminum hydroxide, kaolin, calcined kaolin, amorphous silica, urea-formalin resin powder, etc. Among these, calcined kaolin having oil-absorbing degree of 70 ml/100 g to 80 ml/100 g is specifically preferred.

The coating amount of the above-mentioned pigment during application and formation of a primer layer on a substrate is preferably not less than 2 $g/m^2$, more preferably 4 $g/m^2$, and specifically preferably 7–12 $g/m^2$.

The binder for primer layer includes water soluble polymers and aqueous binders. These may be used solely or in combination of two or more.

The above-mentioned water soluble polymer includes, for example, starch, polyvinyl alcohol, polyacrylamide, carboxymethylcellulose, methylcellulose, casein, etc. The above-mentioned aqueous binder is generally synthetic rubber latex or synthetic resine emulsion, and includes, for example, styrene-butadiene rubber latex, acrylonitrile butadiene rubber latex, methyl acrylate butadiene rubber latex, vinyl acetate emulsion, etc.

The amount of the binder for a primer layer to be used is determined in accordance with film strength, heat sensitivity of a thermosensitive-color developing layer, etc., and is preferably 3–100% by mass, more preferably 5–50% by mass, and specifically preferably 8–15% by mass relative to the mass of the pigment in the primer layer. The primer layer may comprise wax, an antidecolorant, a surfactant, etc.

The coating solution for forming a primer layer can be applied according to a known coating method. Specific examples include coating methods using an air knife coater, a roll coater, a blade coater, a gravure coater, a curtain coater, etc. Among these, a coating method using a curtain coater or a blade coater is preferable, and a coating method using a blade coater is more preferable. After application and drying, smoothing treatment (and if necessary, calendaring), etc. may be provided to the primer layer.

The method using the above-mentioned blade coater is not limited to coating method using a bevel type blade or a pent type blade, and includes coating method using a rod blade, coating method using a pill blade, etc. Furthermore, the coating method is not limited to methods using an off-machine coater, and coating can be carried out using an on-machine coater provided on a paper pressing machine. In addition, in order to obtain superior smoothness and surface shape by providing flowability during blade coating, the coating solution for forming a primer layer (a coating solution for a undercoat layer) may comprise carboxymethylcellulose having an etheration degree of 0.6–0.8 and an weight average molecular weight of 20000–200000 by 1–5% by mass, preferably 1–3% by mass relative to the amount of the above-mentioned pigment.

The coating amount of the primer layer is, although it is not specifically limited, preferably not less than 2 g/m$^2$, more preferably not less than 4 g/m$^2$, and specifically preferably not less than 7–12 g/m$^2$ in accordance with the characteristic of the thermosensitive recording material.

In the invention, primer base paper having a primer layer (specifically preferably a primer layer having high oil-absorbing property, high adiabatic effect and high planarity) is preferred, and primer base paper having a primer layer comprising an oil-absorbing pigment using a blade coater is specifically preferred in view of improvement of sensitivity and image quality.

The thermosensitive recording material of the invention is usefully excellent in plasticizer resistance. Preferably, the preserving rate in a formed image after printing with which a vinyl chloride resin wrap containing the plasticizer of 25% by mass or more is brought into contact, after being left for 1 hour under environmental conditions of 25° C. and a relative humidity of 50% is set to 50% or more. As mentioned above, by incorporating the electron-accepting compound represented by the Formula (1) (specifically preferably 4-hydroxybenzenesulfoneanilide), preferably an image stabilizer, etc., the above-mentioned the preserving rate can be adjusted in the above-mentioned range. Accordingly, the formed image can be maintained at high density for a long period, and can be applied to the field in which image reliability is required for a long period such as applications for receipts of POS registers, storage of important documents, advance tickets, cash vouchers, etc.

The preserving rate of the image is represented, as shown in the following equation, by the ratio (%) of the density of an image after standing under the atmosphere of temperature of 25° C. and relative humidity of 50% for 1 hr after photographic printing, relative to the image density measured using Macbeth reflection densitometer (e.g., RD-918) immediately after photographic printing of the image, wherein both printing are conducted under the same condition.

Preserving rate=[(Image density after standing)/(Image density immediately after printing)]×100

The total ion concentration of Na$^+$ ion and K$^+$ ion included in the thermosensitive recording material is preferably not less than 1500 ppm, more preferably not less than 1000 ppm, and specifically preferably not less than 800 ppm in view of prevention of head corrosion of a thermal head contacting with the thermosensitive recording material. As a result of selecting and using a material having low ion content, the total ion concentration relative to the total of the substrate, layer, etc. constituting the thermosensitive recording material can be suppressed and the amount of ion adhered to the head can be suppressed, which can lead to improvement of anticorrosion property (durability) of the thermal head.

The ion concentration of the above-mentioned Na$^+$ ion and K$^+$ ion can be measured by extracting the thermosensitive recording material with heated water and measuring the heated water for ion masses of Na$^+$ ion and K$^+$ ion by ion quantitative analysis method by atomic absorption method. The above-mentioned total ion concentration is represented by ppm relative to the total mass of the thermosensitive recording material.

For the thermosensitive recording material of the invention, wettablity of the surface of the thermosensitive recording layer, i.e., the contact angle of the droplet of distilled water dropped on the surface of the thermosensitive recording layer after 0.1 second is preferably not less than 20°, and more preferably 50°. By adjusting the above-mentioned contact angle to the above-mentioned range, bleeding of ink after printing using an ink jet printer or after stamping can be prevented effectively (provision or improvement of ink jet applicability), by which improvement of stamping applicability can be achieved.

The above-mentioned contact angle can be obtained by incorporating an electron-accepting compound represented by the Formula (1) (preferably 4-hydroxybenzenesulfonanilide). Alternatively, a method comprising adding materials capable of maintaining the contact angle of distilled water on the recording surface, such as a sensitizer, paraffin wax used for the invention, to the thermosensitive recording layer is also preferable.

The above-mentioned contact angle can be measured by dropping distilled water on the surface (recording surface) of the thermosensitive recording layer thermal of the sensitive recording material and measuring the contact angle after 0.1 second by a conventional method, for example, using a dynamic contact angle absorption tester such as FIBRO system (trade name: DAT1100, manufactured by FIBRO System AB), etc.

The thermosensitive recording material of the invention is usefully excellent in image preservability. Preferably, the residual density rate in a formed image after being left for 24 hours under environmental conditions of 60° C. and a relative humidity of 20% after printing is set to 65% or more. As described above, the thermosensitive recording material contains the electron-accepting compound (in particular preferably, 4-hydroxybenzene sulfonanilide) represented by the Formula (1), and preferably contains the image stabilizer or the like. Thereby the residual density rate can be set to the above range. As a result, the high density forming image can be maintained for a long period of time as described above, and the thermosensitive recording material can be applied in the fields demanding the long-term image reliability such as the storage of important documents, tickets for advance sale, receipt and premium tickets.

As shown in the following formula, the residual density rate of the image is represented by the ratio (%) of the image density after printing under the same condition and being left for 24 hours under environmental conditions of 60° C. and a relative humidity of 20% to the image density measured by a Macbeth reflection densitometer (for instance, trade name: RD-918 manufactured by Macbeth Company) immediately after printing. The residual density rate of a formed image after printing after being left for 24 hours under environmental conditions of 60° C. and a relative humidity of 20% is set to 65% or more.

Residual density rate=[(image density after being left)/(image density immediately after printing)]×100

The thermosensitive recording material of the invention is used for a recording device which thermal prints (photo print) at the speed of 10 cm/sec or more, and the printing (photo printing) can be performed on the thermosensitive recording layer constituted as described above by directly thermal printing like an image on the surface of the thermosensitive recording layer or on the surface through the protective layer when having the protective layer.

If the recording device prints and photo prints due to thermal impression at the speed of 10 cm/sec or more, the recording device can be suitably selected without being limited. Of these, the recording device provided with the thermal head having the partial glaze structure is preferable. Specific examples include KF2003-GD31A (trade name, manufactured by Roam Co., Ltd.) and KF2003-GL41A (trade name, manufactured by Roam Co., Ltd.).

In the specification, "partial glaze structure" means a structure of a heating element (thermal head) for recording by thermosensitive method or thermal transfer method or the like, the structure wherein the glaze layer which composes the heating element and of which cross section is formed in the shape of a convex lens (ridge shape) on the substrate to an full-surface glaze structure which is usually used for the thermosensitive recording material (mainly used for the thermal transfer application; for instance, JP-A No. 2001–232838 (numeral 2 or the like in FIG. 1)).

EXAMPLES

Hereinafter the invention is explained with referring the Examples. However, the invention should not be construed to be limited to these Examples. As used herein, the "parts" and "%" in Examples each means "parts by mass" and "% by mass", respectively.

Example 1-1

Preparation of a Coating Solution for a Thermosensitive Recording Layer

Preparation of Dispersion Liquid A (Containing an Electron-Donating Colorless Dye)

The following components were dispersed and mixed in a ball mill to give dispersion liquid A having the volume average particle size of 0.7 μm. The volume average particle size was measured using a laser diffraction type size distribution measuring instrument (trade name: LA500, manufactured by Horiba, Inc.).

Composition of Dispersion Liquid A
2-Anilino-3-methyl-6-diethylaminofluorane . . . 10 parts
(an electron-donating colorless dye)
Polyvinyl alcohol 2.5% solution . . . 50 parts
(trade name: PVA-105, manufactured by Kuraray Co., Ltd.)
Preparation of dispersion liquid B (containing an electron-accepting compound)

The following components were dispersed and mixed in a ball mill to give dispersion liquid B having the volume average particle size of 0.7 μm. The volume average particle size was measured according to a similar manner to that for dispersion liquid A.

Composition of Dispersion Liquid B
4-Hydroxybenzenesulfoneanilide . . . 20 parts
(an electron-accepting compound represented by the Formula (1))
Polyvinyl alcohol 2.5% solution . . . 100 parts
(trade name: PVA-105, manufactured by Kuraray Co., Ltd.)
Preparation of Dispersion Liquid C (Containing a Sensitizer)

The following components were dispersed and mixed in a ball mill to give dispersion liquid C having the volume average particle size of 0.7 μm. The volume average particle size was measured according to a similar manner to that for dispersion liquid A.
Composition of Dispersion Liquid C
2-Benzyloxynaphthalene (a sensitizer) . . . 20 parts
Polyvinyl alcohol 2.5% solution . . . 100 parts
(trade name: PVA-105, manufactured by Kuraray Co., Ltd.)

Preparation of Dispersion Liquid D (Containing a Pigment)
The following components were dispersed and mixed in a sand mill to give dispersion liquid D having the volume average particle size of 2.0 μm. The volume average particle size was measured according to a similar manner to that for dispersion liquid A.

Composition of Dispersion Liquid D
Calcite light calcium carbonate . . . 40 parts
(trade name: UNIVER 70, manufactured by Shiraishi Kogyo K.K.)
Sodium polyacrylate . . . 1 parts
Water . . . 60 parts Preparation of a Coating Solution for a Thermosensitive Recording Layer
The following components were mixed to give a coating solution for a thermosensitive recording layer.

Composition of a Coating Solution for a Thermal Recording Layer
Dispersion liquid A . . . 60 parts
Dispersion liquid B . . . 120 parts
Dispersion liquid C . . . 120 parts
Dispersion liquid D . . . 101 parts
Zinc stearate 30% dispersion liquid . . . 15 parts
Paraffin wax (30%) . . . 20 parts
Sodium dodecylbenzenesulfonate (25%) . . . 3 parts Preparation of a Coating Solution for a Substrate Undercoat Layer
The following components were mixed by stirring using a dissolver to give a dispersion liquid.
Calcined kaolin (oil-absorption amount 75 ml/100 g) . . . 100 parts
Sodium hexametaphosphate . . . 1 parts
Water . . . 110 parts
To the obtained dispersion liquid were then added SBR (styrene-butadiene rubber latex, 20 parts) and an oxidized starch (25%, 25 parts) to give a coating solution for a substrate undercoat layer.

Preparation of a Thermosensitive Recording Material
Quality paper having a smoothness degree measured by JIS-P8119 of 150 seconds was prepared as a substrate. To the surface of the quality paper was applied the coating solution for a substrate undercoat layer obtained as above by a blade coater so that the coating amount after drying became 8 g/m$^2$ to give an undercoat layer. By applying the undercoat layer, the smoothness degree measured by JIS-P8119 of the substrate became 350 seconds.

On the undercoat layer was then applied the coating solution for a thermosensitive recording layer as obtained above using a curtain coater so that the coating amount after drying became 4 g/m$^2$ and dried to form a thermosensitive recording layer. To the surface of the thus-formed thermosensitive recording layer was then calendared to give the thermosensitive recording material of the invention (1–1).

For the obtained thermosensitive recording material (1), the color development density (measured by Macbeth reflection densitometer RD-918) at the applied energy of the thermal head of 15.2 mJ/mm$^2$, which was measured according to the similar conditions and method for the evaluation mentioned below, was 1.28.

Example 1-2

Preparation of Dispersion Liquid E
The following components were dispersed and mixed in a sand mill to give dispersion liquid E having the volume average particle size of 0.7 µm. The volume average particle size was measured according to a similar manner to Example 1-1.

(Composition of Dispersion Liquid E)
1,1,3-Tris(2-methyl-4-hydroxy-5-tert-butylphenyl)butane (an image stabilizer) . . . 5 parts
Polyvinyl alcohol 2.5% solution . . . 25 parts
(trade name: PVA-105, manufactured by Kuraray Co., Ltd.; an adhesive)

Preparation of a Coating Solution for a Thermosensitive Recording Layer

Dispersion liquids A, B, C and D were prepared according to a similar manner to Example 1-1 and mixed with the dispersion liquid E obtained above by the following composition to give a coating solution for a thermosensitive recording layer. Furthermore, according to a similar manner to Example 1-1, the thermosensitive recording material of the invention (1-2) was provided.

(Composition of a Coating Solution for a Thermosensitive-Color Develop Layer)
Dispersion liquid A . . . 60 parts
Dispersion liquid B . . . 120 parts
Dispersion liquid C . . . 120 parts
Dispersion liquid E . . . 30 parts
Dispersion liquid D . . . 101 parts
Zinc stearate 30% dispersion liquid . . . 15 parts
Paraffin wax (30%) . . . 20 parts
Sodium dodecylbenzenesulfonate (25%) . . . 3 parts Example 1-3

Dispersion liquid E' was prepared according to a similar manner to Example 1-2 except that 1,1,3-tris(2-methyl-4-hydroxy-5-cyclohexylphenyl)butane was used instead of 1,1,3-tris(2-methyl-4-hydroxy-5-tert-butylphenyl)butane (an image stabilizer) used for the preparation of the dispersion liquid E. Furthermore, according to the similar manner to Example 2, the thermosensitive recording material of the invention (1-3) was provided.

Examples 1-4 and 1-5

The thermosensitive recording materials of the invention (1-4) and (1-5) according to a similar manner to Example 1-1 except that amorphous silica (trade name: MIZUKASIL P832, manufactured by Mizusawa Industrial Chemicals, Ltd., 20 parts) and aluminum hydroxide (trade name: HYGILITE H42, manufactured by Showa Denko K.K., 40 parts) were used respectively instead of calcite light calcium carbonate (UNIVER 70; inorganic pigment, 40 parts) used for the preparation of dispersion liquid D.

Example 1-6

The thermosensitive recording material of the invention (1-6) was obtained according to a similar manner to Example 1-1 except that a sulfo-modified polyvinyl alcohol (trade name: GOHSERAN L3266, manufactured by Nippon Synthetic Chemical Industry Co., Ltd., 2.5% aqueous solution) was used instead of polyvinyl alcohol 2.5% aqueous solution (an adhesive) used for the preparations of dispersion liquids A, B and C.

Example 1-7

The thermosensitive recording material of the invention (1-7) was obtained according to a similar manner to Example 1-1 except that polyvinyl alcohol 2.5% aqueous solution (an adhesive) used for the preparations of dispersion liquids A, B and C was changed to a diacetone-modified polyvinyl alcohol (trade name: D500, manufactured by Unitika Ltd., 2.5% aqueous solution), and that adipic acid dihydrazide 5% aqueous solution (a crosslinking agent, 13 parts) was added to the coating solution for a thermosensitive recording layer obtained by mixing the thus-obtained dispersion liquids A', B' and C' according to a similar manner to Example 1-1.

Example 1-8

The thermosensitive recording material of the invention (1-8) was obtained according to a similar manner to Example 1-1 except that polyvinyl alcohol 2.5% aqueous solution (an adhesive) used for the preparations of dispersion liquids A, B and C was changed to an acetoacetyl-modified polyvinyl alcohol (trade name: GOHSEFIMER Z210, manufactured by Nippon Synthetic Chemical Industry Co., Ltd., 2.5% aqueous solution), and that glyoxal 5% aqueous solution (a crosslinking agent, 13 parts) was added to the coating solution for a thermosensitive recording layer obtained by mixing the thus-obtained dispersion liquids A", B" and C" according to a similar manner to Example 1-1.

Example 1-9

The thermosensitive recording material of the invention (1-9) was obtained according to a similar manner to Example 1-1 except that recycled paper (50 g/m$^2$) comprising recycled pulp (70%) and LBKP (30%) and having the smoothness degree measured by JIS-P8119 of 170 seconds was used instead of the quality paper used as a substrate in Example 1-1.

Example 1-10

The thermosensitive recording material of the invention (1-10) was obtained according to a similar manner to Example 1-1 except that the method comprising applying the coating solution for a thermosensitive recording layer obtained in Example 1-1 and the coating solution for a protective layer having the following composition simultaneously to form multiple layers using a curtain coater, drying and calendaring on the surface of the laminated protective layer was used instead of the method comprising applying a coating solution for a thermosensitive recording layer, drying and calendaring after formation of an undercoat layer on a substrate in the "Preparation of a thermosensitive recording material" of Example 1-1. The dried coating amount of the protective layer was 2.0 g/m$^2$.

Preparation of a Coating Solution for a Protective Layer

The following composition was dispersed using a sand mill, a pigment dispersion having the volume average particle size of 2 µm was prepared. The volume average particle size was measured according to a similar manner to Example 1-1.
Aluminum hydroxide (average particle size 1 µm) . . . 40 parts
(trade name: HYGILITE H42, manufactured by Showa Denko K.K.)

Sodium polyacrylate . . . 1 parts

Water . . . 60 parts

A mixture of urea phosphate esterified starch 15% aqueous solution (trade name: MS4600, manufactured by Nihon Shokuhin Kako Co., Ltd., 200 parts), polyvinyl alcohol 15% aqueous solution (trade name: PVA-105, manufactured by Kuraray Co., Ltd., 200 parts) and water (60 parts) was prepared separately. To the mixture were added the pigment dispersion as obtained above, and zinc stearate emulsified dispersion having the volume average particle size of 0.15 µm (trade name: HYDRIN F115, manufactured by Chukyo Yushi Co., Ltd., 25 parts) and sulfosuccinic acid 2-ethylhexylester sodium salt 2% aqueous solution (125 parts) to give a coating solution for protective layer.

Examples 1-11 to 1-13

The thermosensitive recording materials of the invention (1-11) to (1-13) were obtained according to a similar manner to Example 6 except that aluminum hydroxide (trade name: HYGILITE H43, volume average particle size 0.7 µm, manufactured by Showa Denko K.K., 40 parts), kaolin (trade name: KAOBRITE, volume average particle size 2.5 µm, manufactured by Shiraishi Kogyo K.K., 40 parts) and amorphous silica (trade name: MIZUKASIL P707, volume average particle size 2.2 µm, manufactured by Mizusawa Industrial Chemicals, Ltd., 20 parts) were used respectively instead of aluminum hydroxide (HYGILITE H42; an inorganic pigment, 40 parts) used for the preparation of the coating solution for a protective layer of Example 1-10.

Examples 1-14 to 1-20

The thermosensitive recording materials of the invention (1-14) to (1-20) were obtained according to a similar manner to Example 1-1 except that dimethylbenzyl oxalate (trade name: HS3520R-N, manufactured by Dainippon Ink and Chemicals, Inc.), m-terphenyl, ethyleneglycol tolyl ether, p-benzylbiphenyl, 1,2-diphenoxymethylbenzene, diphenylsulfone and 1,2-diphenoxyethane were used respectively instead of 2-benzyloxynaphthalene (a sensitizer) used for the preparation of dispersion liquid C.

Examples 1-21 to 1-25

The thermosensitive recording materials of the invention (1-21) to (1-25) were obtained according to a similar manner to Example 1-1 except that 2-anilino-3-methyl-6-dibutylaminofluorane, 2-anilino-3-methyl-6-(N-ethyl-N-isoamylamino)fluorane, 2-anilino-3-methyl-6-(N-ethyl-N-propylamino)fluorane, 2-anilino-3-methyl-6-di-n-amylaminofluorane and 2-anilino-3-methyl-6-(N-ethyl-N-p-tolylamino)fluorine were used respectively instead of 2-anilino-3-methyl-6-diethylaminofluorane (an electron-donating colorless dye) used for the preparation of dispersion liquid A of Example 1-1.

Example 1-26

The thermosensitive recording material of the invention (1-26) was obtained according to a similar manner to Example 1-1 except that an air knife coater was used instead of a curtain coater used for the application of the coating solution for a thermosensitive recording layer in Example 1-1.

Examples 1-27 to 1-30

The thermosensitive recording materials of the invention (1-27) to (1-30) were obtained according to a similar manner to Example 1-1 except that N-benzyl-4-hydroxybenzenesulfoneamide (=p-N-benzylsulfamoylphenol), BTUM, 4-hydroxy-4'-isopropoxydiphenylsulfone, and 2,4-bis(phenylsulfonyl)phenol were used respectively instead of 4-hydroxybenzenesulfoneanilide (an electron-accepting compound) used for the preparation of dispersion liquid B in Example 1-1.

Comparative Examples 1-1 and 1-2

The comparative thermosensitive recording materials (1-31) and (1-32) were obtained according to a similar manner to Example 1-1 except that 4,4'-dihydroxydiphenolsulfone and zinc 4-β-p-methoxyphenoxyethoxy salicylate were used respectively instead of 4-hydroxybenzenesulfoneanilide (an electron-accepting compound) used for the preparation of dispersion liquid B in Example 1-1.

Example 2-1

The thermosensitive recording material (2-1) of the invention was obtained in the same manner as in Example 1-1 except for using a zinc stearate dispersed liquid (30%) of 20 parts and sodium dodecylbenzenesulfonate (25%) of 3 parts in the composition of a thermosensitive recording layer coating solution.

Example 2-2

The thermosensitive recording material (2-2) of the invention was obtained in the same manner as in Example 1-2 except for using a zinc stearate dispersed liquid (30%) of 20 parts, paraffin wax (30%) of 15 parts and sodium dodecylbenzenesulfonate (25%) of 3 parts in the composition of a thermosensitive recording layer coating solution.

Example 2-3 to 2-30

The thermosensitive recording materials (2-3 to 2-30) of the invention were obtained in the same manner as in Examples 1-3 to 1-30 except for using Example 2-1 or Example 2-2 respectively instead of Example 1-1 or Example 1-2.

Comparative Example 2-1

The thermosensitive recording material (2-31) of Comparative Example was obtained in the same manner as in Example 2-1 except that 2-benzyloxynaphthalene used for preparing the dispersed liquid C of Example 2-1 was replaced with stearamide.

Example 3-1

The thermosensitive recording material (3-1) of the invention was obtained in the same manner as in Example 1-1 except for using paraffin wax (30%) of 20 parts in the composition of a thermosensitive recording layer coating solution.

Example 3-2

The thermosensitive recording material (3-2) of the invention was obtained in the same manner as in Example 1-2 except for using paraffin wax (30%) of 15 parts in the composition of a thermosensitive recording layer coating solution.

Example 3-3 to 3-30

The thermosensitive recording materials (3-3 to 3-30) of the invention were obtained in the same manner as in Examples 1-3 to 1-30 except for using Example 3-1 or Example 3-2 respectively instead of Example 1-1 or Example 1-2.

Example 3-31

The thermosensitive recording material (3-31) of the invention was obtained in the same manner as in Example 3-1 except that the volume-averaged grain size of 0.7 μm was replaced with the volume-averaged grain size of 0.5 μm in the dispersed liquid A containing the electron-donating colorless dye in Example 3-1.

Example 3-32

The thermosensitive recording material (3-32) of the invention was obtained in the same manner as in Example 3-1 except that the volume-averaged grain size of 0.7 μm was replaced with the volume-averaged grain size of 1.0 μm in the dispersed liquid A containing the electron-donating colorless dye in Example 3-1.

Example 3-33

The thermosensitive recording material (3-33) of the invention was obtained in the same manner as in Example 3-1 except that the volume-averaged grain size of 0.7 μm was replaced with the volume-averaged grain size of 0.5 μm in the dispersed liquid B containing the electron-accepting compound in Example 3-1.

Example 3-34

The thermosensitive recording material (3-34) of the invention was obtained in the same manner as in Example 3-1 except that the volume-averaged grain size of 0.7 μm was replaced with the volume-averaged grain size of 1.0 μm in the dispersed liquid B containing the electron-accepting compound in Example 3-1.

Comparative Examples 3-1 and 3-2

The thermosensitive recording materials (3-35) and (3-36) of Comparative Examples were obtained in the same manner as in Example 3-1 except that 4-hydroxybenzene sulfonanilide (electron-accepting compound) used for preparing the dispersed liquid B of Example 3-1 was replaced with 2,2'-bis (4-hydroxyphenol) propane (bisphenol A) or 4,4'-dihydroxydiphenylsulfone.

Comparative Example 3-3

The thermosensitive recording material (3-37) of Comparative Example were obtained in the same manner as in Example 3-1 except that 4-hydroxybenzene sulfonanilide (electron-accepting compound) used for preparing the dispersed liquid B of Example 3-1 of 20 parts was replaced with 4-hydroxybenzene sulfonanilide of 4 parts.

Comparative Example 3-4

The thermosensitive recording material (3-38) of Comparative Example was obtained in the same manner as in Example 3-1 except that the volume-averaged grain size of 0.7 μm was replaced with the volume-averaged grain size of 0.4 μm in the dispersed liquid A containing the electron-donating colorless dye in Example 3-1.

Comparative Example 3-5

The thermosensitive recording material (3-39) of Comparative Example was obtained in the same manner as in Example 3-1 except that the volume-averaged grain size of 0.7 μm was replaced with the volume-averaged grain size of 1.3 μm in the dispersed liquid A containing the electron-donating colorless dye in Example 3-1.

Comparative Example 3-6

The thermosensitive recording material (3-40) of Comparative Example was obtained in the same manner as in Example 3-1 except that the volume-averaged grain size of 0.7 μm was replaced with the volume-averaged grain size of 1.3 μm in the dispersed liquid B containing the electron-accepting compound in Example 3-1.

Evaluation

The thermosensitive recording materials (1-1) to (1-30) of the invention and the thermosensitive recording materials (1-1) and (1-2) of Comparative Examples obtained as described above were measured and evaluated as follows. The following table 1 shows the results of the measurement and evaluation.

(1) Measurement of Sensitivity

Using a thermosensitive printing apparatus comprising a thermal head having partially-glazed structure (trade name: KF2003-GD31A, manufactured by Rohm Co., Ltd.), printing was carried out. The printing was carried out under the conditions of the head voltage of 24V and the printing frequency of 0.98 ms/line (printing velocity 12.8 cm/seconds) at the pulse width of 0.375 ms (applied energy 15.2 mJ/mm$^2$), and the printing density was measured using Macbeth reflection densitometer (trade name: RD-918, manufactured by Macbeth Corporation).

(2) Evaluation of Head Contamination

The surface of the thermal head after respectively performing "(1) Measurement of sensitivity" in each thermosensitive recording materials and the quality of the recorded image (recording quality) were visually observed, and were evaluated according to the following reference.

[Reference]

◯: No contamination existed on the surface of the head, and no abnormal feeling of the recording quality was observed.

Δ: No abnormal feeling of the recording quality was observed though the contamination of the surface of the head is slightly seen.

x: Contamination was observed on the surface of the head, and contamination was deposited on the recording surface.

(3) Plasticizer Resistance

The thermosensitive recording material is printed by the same device and same condition as described in "(1) measurement of sensitivity". The density of the image immediately after printing and the density of the image after being left for 1 hour under environmental conditions of 25° C. and a relative humidity of 50% were measured by a Macbeth reflection densitometer (trade name: RD-918, manufactured by Macbeth Company) with a vinyl chloride resin wrap (trade name: polymer wrap 300 (containing the plasticizer of 40%) manufactured by Shin-Etsu Polymer Co., Ltd.) brought into contact with the image. The ratio of the image density after left (%; conservation rate) to the image density immediately after printing was calculated based on the following formula, and was the index for evaluating the plasticizer resistance. It is shown that the higher the numerical value is, the more excellent the plasticizer resistance is.

Conservation rate=[(image density after being left)/(image density immediately after printing)]×100

(4) Evaluation of Background Fogging

Each of the thermosensitive recording materials was left under the environment condition of the temperature of 60° C. and the relative humidity of 20% for 24 hr, and the density of the background portion (non-image portion) thereof was measured using Macbeth reflection densitometer (trade name: RD-918, manufactured by Macbeth Corporation) for each of the materials. The lower the value becomes, the better the background fogging becomes.

(5) Evaluation of Image Retention Property

The above-mentioned thermosensitive recording material was subjected to photographic printing under the same apparatus and condition as those for the "(1) Measurement of sensitivity". Immediately after the photographic printing of the image, the image density and the image density after standing under the atmosphere of the temperature of 60° C. and the relative humidity of 20% for 24 hr using Macbeth reflection densitometer (trade name: RD-918, manufactured by Macbeth Corporation). Thereafter the ratio of the image density after standing relative to the image density immediately after printing of image (%; residual density ratio) based on the following equation, which was used as an index for evaluating the image retention property. The higher the value becomes, the better the image retention property becomes.

Residual density ratio=[(Image density after standing)/(Image density immediately after printing)]×100

(6) Evaluation of Chemical Resistance

The above-mentioned thermosensitive recording material was subjected to photographic printing under the same apparatus and condition as those for the "(1) Measurement of sensitivity". On the surface of the background portion and the photographic printed portion were each written using a fluorescence pen (trade name: Zebra fluorescence pen 2-pink, manufactured by Zebra Co., Ltd.). The degree of background fogging of the background portion and the image density of the image part of the thermosensitive recording material after 1 day were visually observed and evaluated according to the following criteria.

[Criteria]

○: Increase of background fogging density of the background part was not observed, and density change of the image part was also not observed.

Δ: Increase of background fogging density of the background part was observed slightly, but the image density part was slightly low.

X: Increase of background fogging density of the background part was observed significantly, and the image part was almost diminished.

(7) Evaluation of Worn Out Head

Using a word processor (trade name: RUPO 95JV, manufactured by Toshiba Corporation), a test chart having the printing ratio of 20% was printed on 1,000 piece of A4 sheets. The number of omission of dots was used as an index for the evaluation of worn out head.

(8) Evaluation of Ink Jet Applicability

[1] Ink Resistance

The above-mentioned thermosensitive recording material was subjected to photographic printing under the same apparatus and condition as those for the "(1) Measurement of sensitivity". The image density ($D^1$) immediately after printing was measured using Macbeth reflection densitometer (trade name: RD918, manufactured by Macbeth Corporation). The surface of the thermosensitive recording layer on which photographic printing has been provided (printing parts subjected to photographic printing) was contacted with the image that had been formed by high image quality printing using an ink jet printer (trade name: EPSON MJ930C, manufactured by Epson Inc.). The image density ($D^2$) of the thermosensitive recording layer after standing at 25° C. for 48 hr was measured using Macbeth reflection densitometer RD918. Residual density ratio (%; $D^2/D^1 \times 100$) was calculated from the obtained density for each of the thermosensitive recording materials, which was used as an index for evaluating the ink resistance for ink jet. The higher the value becomes, the better the ink resistance becomes.

[2] Ink Jet Recording Applicability

Letters were printed on each of the thermosensitive recording materials using a word processor (trade name: RUPO JW-95JU, manufactured by Toshiba Corporation). To the thus-printed thermosensitive recording layer was further printed using an ink jet printer, and the bleeding of the ink on the ink jet-recorded part and the fading of the letter part printed by a word processor were evaluated visually according to the following criteria.

(Criteria)

○: Bleeding of ink and fading of letter parts were little and, the letters could be read without any problem.

Δ: A part of letter part was squeezed out, and the letters could be read with difficulty.

X: Letter part was completely diminished, and the letters could not be read.

(9) Measurement of Contact Angle

Distilled water was dropped on the surface of the thermosensitive recording layer of the thermosensitive recording material (a recording surface), and the contact angle after 0.1 second was measured using FIBRO system (trade name: DAT1100, manufactured by FIBRO system, ab). The greater the value becomes, the more useful the material becomes in view of its effects.

(10) Measurement of Concentration for Ions ($Na^+$ and $K^+$)

The thermosensitive recording material was extracted with heated water respectively, and the extract was measured by ion quantitative analysis by atomic absorption method for ion masses of $Na^+$ ion and $K^+$ ion. The ion concentrations in Tables 1-4 represent the total ion concentration for $Na^+$ and K+, which shows the total ppm value relative to the total mass of the thermosensitive recording material.

Further, the result of printing by using the thermosensitive recording material (1-1) obtained by Example 1-1, the color development density measured by Macbeth reflection densitometer RD-918 (trade name) at the applied energy of the thermal head of 15.2 mJ/mm$^2$, which was measured according to the similar conditions and method for the evaluation A mentioned above, was 1.05.

The thermosensitive recording materials (2-1 to 2-30) of the invention, the thermosensitive recording material (2-31) of Comparative Example, the thermosensitive recording materials (3-1 to 3-34) of the invention and the thermosensitive recording materials (3-35 to 3-40) of Comparative Examples were properly measured and evaluated as described above. The following tables 2 and 3 show the results of the measurement and evaluation.

TABLE 1

| | Thermal recording material | Image density (Sensitivity) | Head contamination | Plasticizer resistance | Image preservability | Ground portion fog density | Chemical resistance | Ink jet capability — Disconnection of head | Ink resistance | Ink jet recording capability | Contact angle (°) | Ion density (ppm) |
|---|---|---|---|---|---|---|---|---|---|---|---|---|
| Example 1-1 | 1-1 | 1.28 | ○ | 75% | 95% | 0.09 | ○ | 0 | 90% | ○ | 51 | 780 |
| Example 1-2 | 1-2 | 1.27 | ○ | 78% | 98% | 0.10 | ○ | 0 | 93% | ○ | 55 | 800 |
| Example 1-3 | 1-3 | 1.26 | ○ | 77% | 97% | 0.10 | ○ | 0 | 92% | ○ | 53 | 800 |
| Example 1-4 | 1-4 | 1.26 | ○ | 70% | 93% | 0.10 | ○ | 0 | 88% | ○ | 50 | 770 |
| Example 1-5 | 1-5 | 1.27 | ○ | 76% | 96% | 0.09 | ○ | 0 | 91% | ○ | 55 | 790 |
| Example 1-6 | 1-6 | 1.30 | ○ | 75% | 96% | 0.08 | ○ | 0 | 93% | ○ | 50 | 800 |
| Example 1-7 | 1-7 | 1.29 | ○ | 77% | 97% | 0.08 | ○ | 0 | 92% | ○ | 52 | 800 |
| Example 1-8 | 1-8 | 1.28 | ○ | 76% | 95% | 0.08 | ○ | 0 | 93% | ○ | 55 | 790 |
| Example 1-9 | 1-9 | 1.28 | ○ | 76% | 94% | 0.09 | ○ | 0 | 93% | ○ | 60 | 800 |
| Example 1-10 | 1-10 | 1.23 | ○ | 80% | 98% | 0.09 | ○ | 0 | 98% | ○ | 45 | 800 |
| Example 1-11 | 1-11 | 1.22 | ○ | 85% | 97% | 0.09 | ○ | 0 | 97% | ○ | 42 | 800 |
| Example 1-12 | 1-12 | 1.21 | ○ | 87% | 98% | 0.10 | ○ | 0 | 98% | ○ | 48 | 790 |
| Example 1-13 | 1-13 | 1.20 | ○ | 77% | 96% | 0.10 | ○ | 0 | 92% | ○ | 35 | 800 |
| Example 1-14 | 1-14 | 1.27 | ○ | 73% | 94% | 0.09 | ○ | 0 | 89% | ○ | 50 | 790 |
| Example 1-15 | 1-15 | 1.26 | ○ | 74% | 95% | 0.10 | ○ | 0 | 91% | ○ | 51 | 800 |
| Example 1-16 | 1-16 | 1.28 | ○ | 76% | 94% | 0.09 | ○ | 0 | 92% | ○ | 51 | 790 |
| Example 1-17 | 1-17 | 1.24 | ○ | 72% | 91% | 0.10 | ○ | 0 | 89% | ○ | 50 | 800 |
| Example 1-18 | 1-18 | 1.26 | ○ | 74% | 95% | 0.10 | ○ | 0 | 91% | ○ | 52 | 790 |
| Example 1-19 | 1-19 | 1.28 | ○ | 72% | 93% | 0.09 | ○ | 0 | 89% | ○ | 51 | 800 |
| Example 1-20 | 1-20 | 1.25 | ○ | 70% | 92% | 0.09 | ○ | 0 | 91% | ○ | 50 | 790 |
| Example 1-21 | 1-21 | 1.28 | ○ | 80% | 97% | 0.10 | ○ | 0 | 93% | ○ | 55 | 790 |
| Example 1-22 | 1-22 | 1.26 | ○ | 78% | 95% | 0.10 | ○ | 0 | 88% | ○ | 55 | 780 |
| Example 1-23 | 1-23 | 1.26 | ○ | 77% | 92% | 0.10 | ○ | 0 | 87% | ○ | 55 | 790 |
| Example 1-24 | 1-24 | 1.28 | ○ | 78% | 95% | 0.10 | ○ | 0 | 91% | ○ | 51 | 790 |
| Example 1-25 | 1-25 | 1.24 | ○ | 68% | 88% | 0.08 | ○ | 0 | 85% | ○ | 50 | 780 |
| Example 1-26 | 1-26 | 1.26 | ○ | 74% | 93% | 0.10 | ○ | 0 | 90% | ○ | 52 | 780 |
| Example 1-27 | 1-27 | 1.20 | ○ | 65% | 65% | 0.09 | Δ | 0 | 80% | Δ | 55 | 760 |
| Example 1-28 | 1-28 | 1.22 | ○ | 65% | 98% | 0.12 | ○ | 0 | 92% | ○ | 50 | 800 |
| Example 1-29 | 1-29 | 1.26 | ○ | 60% | 91% | 0.07 | ○ | 0 | 93% | ○ | 52 | 780 |
| Example 1-30 | 1-30 | 1.26 | ○ | 65% | 98% | 0.11 | ○ | 0 | 96% | ○ | 51 | 790 |
| Comparative Example 1-1 | 1-31 | 1.15 | ○ | 65% | 65% | 0.08 | X | 0 | 65% | X | 42 | 780 |
| Comparative Example 1-2 | 1-32 | 1.05 | X | 50% | 50% | 0.09 | Δ | 0 | 55% | Δ | 45 | 760 |

TABLE 2

| | Thermal recording material | Image density (Sensitivity) | Image preservability | Ground portion fog density | Static color development density | Chemical resistance | Ink jet capability — Disconnection of head | Ink resistance | Ink jet recording capability | Contact angle (°) | Ion density (ppm) |
|---|---|---|---|---|---|---|---|---|---|---|---|
| Example 2-1 | 2-1 | 1.28 | 95% | 0.09 | 0.10 | ○ | 0 | 90% | ○ | 51 | 780 |
| Example 2-2 | 2-2 | 1.27 | 98% | 0.10 | 0.12 | ○ | 0 | 93% | ○ | 55 | 800 |
| Example 2-3 | 2-3 | 1.26 | 97% | 0.10 | 0.12 | ○ | 0 | 92% | ○ | 53 | 800 |
| Example 2-4 | 2-4 | 1.26 | 93% | 0.10 | 0.12 | ○ | 0 | 88% | ○ | 50 | 770 |
| Example 2-5 | 2-5 | 1.27 | 96% | 0.09 | 0.12 | ○ | 0 | 91% | ○ | 55 | 790 |
| Example 2-6 | 2-6 | 1.30 | 96% | 0.08 | 0.11 | ○ | 0 | 93% | ○ | 50 | 800 |
| Example 2-7 | 2-7 | 1.29 | 97% | 0.08 | 0.11 | ○ | 0 | 92% | ○ | 52 | 800 |
| Example 2-8 | 2-8 | 1.28 | 95% | 0.08 | 0.11 | ○ | 0 | 93% | ○ | 55 | 790 |
| Example 2-9 | 2-9 | 1.28 | 94% | 0.09 | 0.12 | ○ | 0 | 93% | ○ | 60 | 800 |
| Example 2-10 | 2-10 | 1.23 | 98% | 0.09 | 0.12 | ○ | 0 | 98% | ○ | 45 | 800 |
| Example 2-11 | 2-11 | 1.22 | 97% | 0.09 | 0.12 | ○ | 0 | 97% | ○ | 42 | 800 |
| Example 2-12 | 2-12 | 1.21 | 98% | 0.10 | 0.12 | ○ | 0 | 98% | ○ | 48 | 790 |
| Example 2-13 | 2-13 | 1.20 | 96% | 0.10 | 0.12 | ○ | 0 | 92% | ○ | 35 | 800 |
| Example 2-14 | 2-14 | 1.27 | 94% | 0.09 | 0.12 | ○ | 0 | 89% | ○ | 50 | 790 |
| Example 2-15 | 2-15 | 1.26 | 95% | 0.10 | 0.12 | ○ | 0 | 91% | ○ | 51 | 800 |

TABLE 2-continued

|  | Thermal recording material | Image density (Sensitivity) | Image pre-servability | Ground portion fog density | Static color development density | Chemical resistance | Disconnection of head | Ink resistance | Ink jet recording capability | Contact angle (°) | Ion density (ppm) |
|---|---|---|---|---|---|---|---|---|---|---|---|
| Example 2-16 | 2-16 | 1.28 | 94% | 0.09 | 0.11 | ○ | 0 | 92% | ○ | 51 | 790 |
| Example 2-17 | 2-17 | 1.24 | 91% | 0.10 | 0.11 | ○ | 0 | 89% | ○ | 50 | 800 |
| Example 2-18 | 2-18 | 1.26 | 95% | 0.10 | 0.11 | ○ | 0 | 91% | ○ | 52 | 790 |
| Example 2-19 | 2-19 | 1.28 | 93% | 0.09 | 0.10 | ○ | 0 | 89% | ○ | 51 | 800 |
| Example 2-20 | 2-20 | 1.25 | 92% | 0.10 | 0.12 | ○ | 0 | 91% | ○ | 50 | 790 |
| Example 2-21 | 2-21 | 1.28 | 97% | 0.10 | 0.11 | ○ | 0 | 93% | ○ | 55 | 790 |
| Example 2-22 | 2-22 | 1.26 | 95% | 0.10 | 0.11 | ○ | 0 | 88% | ○ | 55 | 780 |
| Example 2-23 | 2-23 | 1.26 | 92% | 0.10 | 0.11 | ○ | 0 | 87% | ○ | 55 | 790 |
| Example 2-24 | 2-24 | 1.28 | 95% | 0.10 | 0.12 | ○ | 0 | 91% | ○ | 51 | 790 |
| Example 2-25 | 2-25 | 1.24 | 88% | 0.08 | 0.10 | ○ | 0 | 85% | ○ | 50 | 780 |
| Example 2-26 | 2-26 | 1.26 | 93% | 0.10 | 0.11 | ○ | 0 | 90% | ○ | 52 | 780 |
| Example 2-27 | 2-27 | 1.20 | 65% | 0.09 | 0.10 | Δ | 0 | 80% | Δ | 55 | 760 |
| Example 2-28 | 2-28 | 1.22 | 98% | 0.12 | 0.14 | ○ | 0 | 92% | ○ | 50 | 800 |
| Example 2-29 | 2-29 | 1.26 | 91% | 0.07 | 0.07 | ○ | 0 | 93% | ○ | 52 | 780 |
| Example 2-30 | 2-30 | 1.26 | 98% | 0.11 | 0.12 | ○ | 0 | 96% | ○ | 51 | 790 |
| Comparative Example 2-1 | 2-31 | 1.22 | 50% | 0.10 | 0.20 | ○ | 0 | 85% | ○ | 60 | 820 |

TABLE 3

|  | Thermal recording material | Electron-donating colorless dye (μm) | Electron-accepting compound (μm) | Image density (Sensitivity) | Image pre-servability | Ground portion fog density | Chemical resistance | Disconnection of head | Ink resistance | Ink jet recording capability | Contact angle (°) | Ion density (ppm) |
|---|---|---|---|---|---|---|---|---|---|---|---|---|
| Example 3-1 | 3-1 | 0.7 | 0.7 | 1.28 | 95% | 0.09 | ○ | 0 | 90% | ○ | 51 | 780 |
| Example 3-2 | 3-2 | 0.7 | 0.7 | 1.27 | 98% | 0.10 | ○ | 0 | 93% | ○ | 55 | 800 |
| Example 3-3 | 3-3 | 0.7 | 0.7 | 1.26 | 97% | 0.10 | ○ | 0 | 92% | ○ | 53 | 800 |
| Example 3-4 | 3-4 | 0.7 | 0.7 | 1.26 | 93% | 0.10 | ○ | 0 | 88% | ○ | 50 | 770 |
| Example 3-5 | 3-5 | 0.7 | 0.7 | 1.27 | 96% | 0.09 | ○ | 0 | 91% | ○ | 55 | 790 |
| Example 3-6 | 3-6 | 0.7 | 0.7 | 1.30 | 96% | 0.08 | ○ | 0 | 93% | ○ | 50 | 800 |
| Example 3-7 | 3-7 | 0.7 | 0.7 | 1.29 | 97% | 0.08 | ○ | 0 | 92% | ○ | 52 | 800 |
| Example 3-8 | 3-8 | 0.7 | 0.7 | 1.28 | 95% | 0.08 | ○ | 0 | 93% | ○ | 55 | 790 |
| Example 3-9 | 3-9 | 0.7 | 0.7 | 1.28 | 94% | 0.09 | ○ | 0 | 93% | ○ | 60 | 800 |
| Example 3-10 | 3-10 | 0.7 | 0.7 | 1.23 | 98% | 0.09 | ○ | 0 | 98% | ○ | 45 | 800 |
| Example 3-11 | 3-11 | 0.7 | 0.7 | 1.22 | 97% | 0.09 | ○ | 0 | 97% | ○ | 42 | 800 |
| Example 3-12 | 3-12 | 0.7 | 0.7 | 1.21 | 98% | 0.10 | ○ | 0 | 98% | ○ | 48 | 790 |
| Example 3-13 | 3-13 | 0.7 | 0.7 | 1.20 | 96% | 0.10 | ○ | 0 | 92% | ○ | 35 | 800 |
| Example 3-14 | 3-14 | 0.7 | 0.7 | 1.27 | 94% | 0.09 | ○ | 0 | 89% | ○ | 50 | 790 |
| Example 3-15 | 3-15 | 0.7 | 0.7 | 1.26 | 95% | 0.10 | ○ | 0 | 91% | ○ | 51 | 800 |
| Example 3-16 | 3-16 | 0.7 | 0.7 | 1.28 | 94% | 0.09 | ○ | 0 | 92% | ○ | 51 | 790 |
| Example 3-17 | 3-17 | 0.7 | 0.7 | 1.24 | 91% | 0.10 | ○ | 0 | 89% | ○ | 50 | 800 |
| Example 3-18 | 3-18 | 0.7 | 0.7 | 1.26 | 95% | 0.10 | ○ | 0 | 91% | ○ | 52 | 790 |
| Example 3-19 | 3-19 | 0.7 | 0.7 | 1.28 | 93% | 0.09 | ○ | 0 | 89% | ○ | 51 | 800 |
| Example 3-20 | 3-20 | 0.7 | 0.7 | 1.25 | 92% | 0.10 | ○ | 0 | 91% | ○ | 50 | 790 |
| Example 3-21 | 3-21 | 0.7 | 0.7 | 1.28 | 97% | 0.10 | ○ | 0 | 93% | ○ | 55 | 790 |
| Example 3-22 | 3-22 | 0.7 | 0.7 | 1.26 | 95% | 0.10 | ○ | 0 | 88% | ○ | 55 | 780 |
| Example 3-23 | 3-23 | 0.7 | 0.7 | 1.26 | 92% | 0.10 | ○ | 0 | 87% | ○ | 55 | 790 |
| Example 3-24 | 3-24 | 0.7 | 0.7 | 1.28 | 95% | 0.10 | ○ | 0 | 91% | ○ | 51 | 790 |
| Example 3-25 | 3-25 | 0.7 | 0.7 | 1.24 | 88% | 0.08 | ○ | 0 | 85% | ○ | 50 | 780 |
| Example 3-26 | 3-26 | 0.7 | 0.7 | 1.26 | 93% | 0.10 | ○ | 0 | 90% | ○ | 52 | 780 |
| Example 3-27 | 3-27 | 0.7 | 0.7 | 1.20 | 65% | 0.09 | Δ | 0 | 80% | Δ | 55 | 760 |
| Example 3-28 | 3-28 | 0.7 | 0.7 | 1.22 | 98% | 0.12 | ○ | 0 | 92% | ○ | 50 | 800 |
| Example 3-29 | 3-29 | 0.7 | 0.7 | 1.26 | 91% | 0.07 | ○ | 0 | 93% | ○ | 52 | 780 |
| Example 3-30 | 3-30 | 0.7 | 0.7 | 1.26 | 98% | 0.11 | ○ | 0 | 96% | ○ | 51 | 790 |
| Example 3-31 | 3-31 | 0.5 | 0.7 | 1.33 | 93% | 0.11 | ○ | 0 | 89% | ○ | 50 | 780 |
| Example 3-32 | 3-32 | 1.0 | 0.7 | 1.20 | 97% | 0.08 | ○ | 0 | 92% | ○ | 51 | 780 |
| Example 3-33 | 3-33 | 0.7 | 0.5 | 1.31 | 95% | 0.09 | ○ | 0 | 91% | ○ | 50 | 780 |
| Example 3-34 | 3-34 | 0.7 | 1.0 | 1.20 | 95% | 0.09 | ○ | 0 | 89% | ○ | 51 | 780 |
| Comparative Example 3-1 | 3-35 | 0.7 | 0.7 | 1.30 | 70% | 0.08 | X | 0 | 60% | X | 45 | 790 |
| Comparative Example 3-2 | 3-36 | 0.7 | 0.7 | 1.15 | 65% | 0.08 | X | 0 | 65% | X | 42 | 780 |
| Comparative Example 3-3 | 3-37 | 0.7 | 0.7 | 1.05 | 50% | 0.09 | Δ | 0 | 55% | Δ | 45 | 760 |
| Comparative Example 3-4 | 3-38 | 0.4 | 0.7 | 1.37 | 91% | 0.14 | ○ | 0 | 90% | ○ | 48 | 780 |

TABLE 3-continued

|  | Thermal recording material | Electron-donating colorless dye (μm) | Electron-accepting compound (μm) | Image density (Sensitivity) | Image pre-servability | Ground portion fog density | Chemical resistance | Discon-nection of head | Ink resis-tance | Ink jet recording capability | Contact angle (°) | Ion density (ppm) |
|---|---|---|---|---|---|---|---|---|---|---|---|---|
| Comparative Example 3-5 | 3-39 | 1.3 | 0.7 | 1.12 | 98% | 0.08 | ○ | 0 | 92% | ○ | 51 | 780 |
| Comparative Example 3-6 | 3-40 | 0.7 | 1.3 | 1.10 | 95% | 0.09 | ○ | 0 | 92% | ○ | 51 | 780 |

As shown in the results of the table 1, in the thermosensitive recording materials (1-1) to (1-30) of the invention, wherein the printing speed is 10 cm/sec or more and the coloring density with printing energy of 15.2 mJ/mm$^2$ is 1.20 or more, the high coloring density (high sensitivity) in a high-speed printing (photo printing) was obtained (the printing capability was excellent) while in particular maintaining the low ground fogging of the ground portion, and no head contamination caused by the high-speed printing (photo printing) was caused. The disconnection caused by the head abrasion did not occur in the thermosensitive recording materials and the thermosensitive recording materials were excellent in the head matching properties. The image preservability and the chemical resistance after the printing were in particular excellent, and the thermosensitive recording materials were excellent also in the point of ink jet capability. That is, the speeding up, the high sensitivity, the whiteness of the ground fogging, the image preservability, the chemical resistance and the ink jet capability were able to be satisfied at the same time without ruining the head contamination and the head matching properties (abrasion resistance).

When the print speed was not set to be 10 cm/sec or more, the image density (sensitivity) was inferior.

In particular, the thermosensitive recording material containing the compound represented by the Formula (1) as the electron-accepting compound was able to provide the image having the high sensitivity and the high density, and can suppress the head contamination due to the high-speed printing. The thermosensitive recording material was excellent in the plasticizer resistance, the image preservability, chemical resistance after printing and the ink jet capability.

In the result of the table 2, the thermosensitive recording materials (2-1) to (2-30) of the invention contain the sensitizer, and the image density after the thermosensitive recording material is brought into contact with a heat source of 70° C. for 5 seconds is 0.15 or less. Thereby, in particular, the high coloring density (high sensitivity) was obtained while maintaining the low ground fogging of the ground portion (the excellent printing capability), and the image preservability after printing was also excellent. The thermosensitive recording materials have the ink jet capability according to the improved contact angle, the excellent chemical resistance and few head abrasion, and is excellent in the matching properties of the thermal head. That is, the high sensitivity, the whiteness of the ground fogging, the image preservability, the ink jet capability, chemical resistance and the matching properties of the thermal head (abrasion resistance) were able to be satisfied at the same time.

In the result of the table 3, the thermosensitive recording materials (1) to (34) of the invention contains the electron-accepting compound, and the volume-averaged grain size of the electron-donating colorless dye and electron-accepting compound is in a range of 0.5 to 1.0 μm. Thereby, in particular, the high coloring density (high sensitivity) was obtained while maintaining the low ground fogging of the ground portion (the excellent printing capability), and the image preservability after printing was also excellent. The thermosensitive recording materials have the ink jet capability according to the improved contact angle, the excellent chemical resistance and the few head abrasion, and is excellent in the matching properties of the thermal head. That is, the high sensitivity, the whiteness of the ground fogging, the image preservability, the ink jet capability, chemical resistance and the head matching properties of the thermal head (abrasion resistance) were able to be satisfied at the same time.

In comparison with the thermosensitive recording materials (1-1), (2-1), and (3-1), the plasticizer resistance, the image preservability, and the ink resistance were able to be further improved in the thermosensitive recording materials ((1-2), (1-3), (2-2), (2-3), (3-2) and (3-3)) containing the image stabilizer, and the high sensitivity and the ground fogging were able to be further reduced in the thermosensitive recording materials ((1-6), (2-6), (3-6)) using a preferable adhesive (protective colloid). A content of the image stabilizer also caused the excellent sealability and the excellent handleability. In the thermosensitive recording materials ((1-10) to (1-13), (2-10) to (2-13) and (3-10) to (3-13)) which are suitable for the invention and in which protective layers containing a specific inorganic pigment are formed, the plasticizer resistance, the image preservability, and the ink resistance (chemical resistance) were able to be further improved. Excellent performances as well as that of thermosensitive recording materials ((1-1), (2-1) and (3-1)) of Examples 1-1, 2-1 and 3-1 were obtained by the sensitizers used in Examples 1-14 to 1-20, 2-14 to 2-20 and 3-14 to 3-20. The excellent coloring and the image preservability were obtained by the electron-donating colorless dye used in Examples 1-21 to 1-25, 2-21 to 2-25 and 3-21 to 3-25 while maintaining the low ground fogging. As shown in Examples 1-1, 2-1, 3-1, 1-26, 2-26 and 3-26, the curtain coating method was more useful in view of the high sensitivity. When the support contained the waste paper pulps (Examples 1-9, 2-9 and 3-9), the other various performances were not hindered.

On the other hand, the high sensitivity was not able to be achieved in Comparative Examples. In particular the point of the head contamination, the image preservability, chemical resistance and the ink jet capability were inferior, and the various performances that the thermosensitive recording material should have was not able to be satisfied at the same time.

The invention can provide the thermosensitive recording material which can be printed (photo print) at a high speed, suppress the fogging density (ground fogging) of the ground portion (non-image portion), can prevent the head contamination caused by the high-speed printing (photo printing), has no head abrasion, and is excellent in the head matching properties. The impression of low energy can cause the high density image by achieving the high-speed printing without the head contamination.

In addition, the thermosensitive recording material can be provided, which can provide the high image having high sharpness, is excellent in the plasticizer resistance, the image preservability, chemical resistance and the light fastness of the forming image, has the ink jet capability without causing the defective hue and bleeding of the ink jet image, and the image discoloration caused by the ink for ink jet, can be printed or sealed on the thermosensitive recording layer or the protective layer, can be formed with a little coating amount (environmental applicability) at low-cost, and has a plain paper-like feel if necessary.

What is claimed is:

1. A thermosensitive recording material comprising:
    a support; and
    a thermosensitive recording layer formed on the support, the thermosensitive recording layer containing an electron-donating colorless dye and an electron-accepting accepting compound which develops color upon a reaction with the electron-donating colorless dye,
   wherein the thermosensitive recording material satisfies all of the following conditions (1) to (3):
   (1) an image density when thermal printing is performed from a side, of the support, having the thermosensitive recording layer with printing energy of 15.2 mJ/mm² is 1.20 or more, and the thermosensitive recording material is used for a recording device having a printing speed of 10 cm/sec or more;
   (2) the thermosensitive recording material contains a sensitizer comprising at least one compound selected from the group consisting of 2-benzyloxynaphthalene, dimethylbenzyloxalate, m-terphenyl, ethyleneglycol tolyl ether, p-benzyl biphenyl, 1,2-diphenoxymethyl benzene, diphenyl sulfone and 1,2-diphenoxy ethane, and an image density after the thermosensitive recording material is brought into contact with a heat source of 70° C. for 5 seconds is 0.15 or less;
   (3) the electron-accepting compound is a compound represented by the following Formula (1):

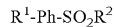 Formula (1)

wherein R¹ represents a hydroxyl group or an alkyl group, R² represents -Ph, —NH-Ph, -Ph-OR³ or —NH—CO—NH-Ph, R³ represents an alkyl group, Ph represents a phenyl group and may be substituted with a substituent containing —SO₂R², and a volume-averaged grain size of the electron-donating colorless dye and electron-accepting compound is in a range of 0.5 to 1.0 μm.

2. A thermosensitive recording material according to claim 1, wherein the recording device is provided with a thermal head having a partial glaze structure.

3. A thermosensitive recording material according to claim 1, wherein a preserving rate of a formed image after printing with which a vinyl chloride resin wrap containing a plasticizer in an amount of 25% by mass or more is brought into contact, after being left for 1 hour under environmental conditions of 25° C. and a relative humidity of 50% is 50% or more.

4. A thermosensitive recording material according to claim 1, wherein the compound represented by the Formula (1) is 4-hydroxybenzene sulfonanilide.

5. A thermosensitive recording material according to claim 1, wherein the thermosensitive recording layer contains an image stabilizer, and the image stabilizer is at least one compound selected from the group consisting of 1,1,3-tris(2-methyl-4-hydroxy-5-tert-butylphenyl) butane and 1,1,3-tris(2-methyl-4-hydroxy-5-cyclohexylphenyl) butane.

6. A thermosensitive recording material according to claim 1, wherein the thermosensitive recording layer contains an inorganic pigment, and the inorganic pigment is at least one compound selected from the group consisting of soft calcite calcium carbonate, amorphous, silica and aluminium hydroxide.

7. A thermosensitive recording material according to claim 1, wherein a protective layer is formed on the thermosensitive recording layer, protective layer contains at least one inorganic pigment selected from the group consisting of aluminium hydroxide, kaoline and amorphous silica, and a water-soluble polymer.

8. A thermosensitive recording material according to claim 1, wherein the electron-donating colorless dye is at least one compound selected from the group consisting of 2-anilino-3-methyl-6diethylaminofluorane, 2-anilino-3-methyl-6-dibutylaminofluorane, 2-anilino-3-methyl-6-(N-ethyl-N-isoamyl amino) fluorane, 2-anilino-3-methyl-6-(N-ethyl-N-propylamino)fluorane, 2-anilino 3-methyl-6-di-n-amyl amino fluorane and 2-anilino 3-methyl-6-(N-ethyl-N-p-tolyl amino) fluorane.

9. A thermosensitive recording material according to claim 1, wherein the support contains waste paper pulp.

10. A thermosensitive recording material according to claim 1, wherein a residual density rate in a formed image after being left for 24 hours under environmental conditions of 60° C. and a relative humidity of 20% after printing is 65% or more.

11. A thermosensitive recording material according to claim 1, wherein a content of the sensitizer is in a range of 75 to 200 parts by mass based on 100 parts by mass of the compound represented by the Formula (1).

12. A thermosensitive recording material according to claim 1, wherein the thermosensitive recording layer contains an adhesive, and the adhesive is at least one compound selected from the group consisting of sulfo-modified polyvinyl alcohol, diacetone-modified polyvinyl alcohol and acetoacetyl-modified polyvinyl alcohol.

13. A thermosensitive recording material according to claim 1, wherein a total ion density of Na³⁰ ions and K⁺ ions is 1500 ppm or less.

14. A thermosensitive recording material according to claim 1, wherein after a drop of distilled water has been dropped on a surface of the thermosensitive recording layer, a contact angle thereof after a lapse of 0.1 seconds is 20° or more.

15. A thermosensitive recording material according to claim 1, wherein at least one layer formed on the support is coated and formed by a curtain coating method.

* * * * *